(12) United States Patent
Haartsen

(10) Patent No.: US 12,464,320 B2
(45) Date of Patent: Nov. 4, 2025

(54) WIRELESS STEREO HEADSET GROUP COMMUNICATIONS

(71) Applicant: Dopple IP B.V., Assen (NL)

(72) Inventor: Jacobus Cornelis Haartsen, Rolde (NL)

(73) Assignee: DOPPLE IP B.V., Assen (NL)

( * ) Notice: Subject to any disclaimer, the term of this patent is extended or adjusted under 35 U.S.C. 154(b) by 488 days.

(21) Appl. No.: 17/959,337

(22) Filed: Oct. 4, 2022

(65) Prior Publication Data

US 2023/0106965 A1    Apr. 6, 2023

Related U.S. Application Data

(60) Provisional application No. 63/251,747, filed on Oct. 4, 2021.

(30) Foreign Application Priority Data

Dec. 23, 2021    (EP) ................................. 21217545

(51) Int. Cl.
*H04W 4/06* (2009.01)
*G06F 3/16* (2006.01)
*H04R 5/033* (2006.01)

(52) U.S. Cl.
CPC .............. *H04W 4/06* (2013.01); *G06F 3/165* (2013.01); *H04R 5/033* (2013.01); *H04R 2420/07* (2013.01)

(58) Field of Classification Search
CPC . H04W 4/06; H04W 4/08; H04W 4/80; G06F 3/165; H04R 5/033; H04R 2420/07; H04R 27/00

USPC ........................................................ 381/311
See application file for complete search history.

(56) References Cited

U.S. PATENT DOCUMENTS 11,032,860 B2 * 6/2021 Chen ........................ H04W 4/80
11,134,350 B2   9/2021 El-Hoiydi et al.
11,416,209 B2 * 8/2022 Vega Zayas ......... H04N 21/439
11,464,072 B2 * 10/2022 Piech ....................... G08B 3/10
(Continued)

FOREIGN PATENT DOCUMENTS

EP    1461908 A1    9/2004
EP    3820128 A1    5/2021
(Continued)

OTHER PUBLICATIONS

Extended European Search Report for EP Application No. 21217545.9 issued on Jun. 28, 2022.
(Continued)

*Primary Examiner* — David L Ton
(74) *Attorney, Agent, or Firm* — David P. Owen; Hoyng Rokh Monegier

(57) ABSTRACT

A communication protocol provides group communications between at least two wireless headsets. Multiple broadcast links, mutually time staggered, are established between the headsets for sequentially sending broadcast messages between group members. Group members can retransmit and forward one or more received broadcast messages to improve robustness and range. In the receiving headset, audio received in broadcast messages from multiple members is combined into a single audio signal provided to the loudspeaker of the receiving headset.

20 Claims, 26 Drawing Sheets

(56) References Cited

U.S. PATENT DOCUMENTS

| | | | | |
|---|---|---|---|---|
| 11,758,329 B2* | 9/2023 | Laaksonen | ............... | H04R 3/12 |
| | | | | 340/4.42 |
| 12,014,110 B2* | 6/2024 | Li | ........................... | G06F 3/165 |
| 12,041,531 B2* | 7/2024 | Lee | ...................... | H04W 88/02 |
| 12,047,444 B2* | 7/2024 | Kim | ...................... | H04L 65/613 |
| 2010/0303014 A1 | 12/2010 | McMullin | | |
| 2022/0197589 A1* | 6/2022 | Liu | ........................ | H04W 4/80 |
| 2024/0168703 A1* | 5/2024 | Lee | ........................ | H04L 65/80 |
| 2024/0264798 A1* | 8/2024 | Lee | ....................... | H04R 27/00 |
| 2024/0357292 A1* | 10/2024 | Lee | ........................ | H04W 4/80 |

FOREIGN PATENT DOCUMENTS

| | | | | |
|---|---|---|---|---|
| EP | 3849223 A1 | 7/2021 | | |
| EP | 3989611 A1 | 4/2022 | | |
| WO | WO-2013020588 A1 * | 2/2013 | ............... | H04J 3/06 |
| WO | 20200253566 A1 | 12/2020 | | |

OTHER PUBLICATIONS

Anwar Mashood et al. "TDMA-Based IEEE 8-2.15.4 for Low-Latency Deterministic Control Applications", IEEE Transaction On Industrial Informatics, IEEE Service Center, NY, US, vol. 12, No. 1, Feb. 1, 2016, pp. 338-347.

N.N.N et al. "IEEE 802.15.4 Stack User Guide", Jun. 22, 2016, pp. 1-204.

Salman N et al. "Overview of the IEEE 802.15.4 standards family for Low Rate Wireless Personal Area Networks", Wireless Communication Systems (ISWCS), 2010 7th International Symposium On, IEEE, Piscataway, NJ, USA, Sep. 19, 2010, pp. 701-705.

Umer Javed et al. "Frequency hopping in IEEE 802.15.4 to mitigate IEEE 802.11 interference and fading", Chinese Journal of Systems Engineering and Electronics, vol. 29, No. 3, Jan. 1, 2018, pp. 445-455.

Search Report for GB Application No. 2214584.1 issued on Nov. 21, 2022.

* cited by examiner

WIRELESS STEREO HEADSET GROUP COMMUNICATIONS

RELATED APPLICATIONS

This application claims the benefit of U.S. Provisional Application No. 63/251,747, filed 4 Oct. 2021 and European Patent Application No. 21217545.9, filed 23 Dec. 2021, all of which are hereby incorporated by reference in its entirety.

TECHNICAL FIELD

The present invention relates generally to exchanging or sharing data, preferably live data, within a group of devices. The invention specifically relates to audio devices and in particular to multiple wireless stereo headsets, and methods therefore, communicating in a group.

BACKGROUND

The use of headsets wirelessly connected to host devices like smartphones, laptops, and tablets is becoming increasingly popular. Whereas consumers used to be tethered to their electronic device with wired headsets, wireless headsets are gaining more traction due to the enhanced user experience, providing the user more freedom of movement and comfort of use. Further momentum for wireless headsets has been gained by smartphone manufacturers abandoning the implementation of the 3.5 mm audio jack, and promoting voice communications and music listening wirelessly, for example, by using Bluetooth® technology.

In addition to communicating over long distances using mobile phones, there is increasing interest in audio communicating over short distances among participants in a group. For consumer applications, one may think of people riding together on a motor bike, people horse riding together, people running together, people cycling together, a group of hikers, people exercising in the gym, etc. They can all benefit from using electronic voice communication devices, especially when the environment is noisy. For professional use, one may think of workers in noisy work environments like saw mills, iron melting factories, car factories, etc. Factory workers in these environments usually wear sound protection earpieces. Communicating with each other in a noisy environment while using sound protection earpieces is practically impossible. Finally, there is the group of people with hearing disabilities. They, for example, have problems in understanding the teacher in the classroom. Furthermore, the hearing capability of elderly people deteriorates which is especially noticeable in areas with a lot of background noise like in a restaurant of bar. In these locations, hearing-impaired people have difficulty to focus on a single talker (the cocktail party effect).

Group communication apps exist to connect groups of people via a (mobile) phone or PC to the internet or a common wired phone network. In the groups' scenarios described above, the participants could each wear a wireless headset and connect via their mobile phone to a group app. However, in case of short distances, the wireless headsets are within radio range of each other and a connection via a mobile phone and/or a remote server would not be necessary and not attractive, as it increases complexity and costs. Furthermore, connecting via a wired phone network or the internet introduces latency, which becomes particularly noticeable when people are in close proximity to each other and see each other's faces. Lip sync then becomes an issue. Other challenges are formed by audio reaching the user's ear directly through the air and reaching the user's ear indirectly via the loudspeaker in the wireless headset. The latter will be delayed and may give rise to echoes.

For these reasons, wireless headsets that can directly wirelessly connect with each other without the support of a phone network or the internet are preferred. In particular when these headsets also have sound protection capabilities and/or additional functionality to help the hearing impaired. These headsets improve the communication capabilities while shutting out unwanted noise from the environment.

The Background section of this document is provided to place embodiments of the present invention in technological and operational context to assist those of skill in the art in understanding their scope and utility. Unless explicitly identified as such, no statement herein is admitted being prior art merely by its inclusion in the Background section.

SUMMARY

One aspect of the invention relates to a method of exchanging audio content between two, three or more sound recording and/or reproduction devices (SRRDs), wherein preferably two SRRDs capture sound and the combined captured sound is produced almost instantaneous at a third different SRRD. The disclosed method of exchanging audio content may enable the different users of SRRDs to exchange audio content with other users with reduced latency. In particular voices of the users can be recorded into live audio data that is exchanged in a group of SRRDs.

In embodiments, SRRDs have a transceiver that allows exchanging data with other SRRDs. The exchanged data can comprise control data and experience data such as audio data. The transceiver can send and receive data and is controlled by a (micro-)controller.

In embodiments, the SRRD may have one or more headphones, one or more sound recording devices, such as a microphone, one or more sound reproduction devices, such as loudspeakers. The SRRD can be formed by or can comprise a cell phone, in particular a smart phone. The SRRD can be any combination of the previous devices or every other device which may have sound recording and/or reproduction capabilities. For example, a mobile phone with a Bluetooth connected headphone can be an SRRD.

In embodiments of any of the disclosed methods, audio content that is to be exchanged as audio data in the group of SRRDs may be provided by some or all of the users of the SRRDs and/or their respective environment. The audio content may be picked up by some or all of the two, three or more SRRDs. The picked up audio content can be a live audio feed at the microphone of the respective SRRD. The audio data can comprise data of the sampled voice of the user(s) of the SRRDs and/or the environment of the user(s). Additionally or alternatively, the audio data may also comprise pre-recorded and/or stored audio data on or available to one or more of the SRRDs. In this application, one, two, three or more or each SRRDs that will share the audio data in the group of SRRDs will be referred to as broadcasting SRRDs. In this application, the one, two, three or more or each SRRDs that will receive and reproduce the audio data in the group of SRRDs will be referred to as reproducing SRRDs. One, two, three or more or each SRRD in the group of SRRD can be part of both broadcasting and reproducing SRRDs.

In embodiments, users of SRRDs can form or become a member of a SRRD broadcasting group to exchange the audio data. A SRRD broadcasting group is formed by sending control data to the SRRDs in a (to-be-formed)

group. Embodiments of the disclosed methods, systems and devices may include configuring an SRRD broadcasting group of two, three or more SRRDs. Some or each user in the group of users can have one or more SRRDs that allow exchanging audio content with members of the group. The SRRD broadcasting group may comprise two or more SRRDs, each used by one or more users to exchange audio data between one or more of the different SRRDs that are a member of this SRRD broadcasting group. Members of the group will have access to the exchanged data, non-members do not.

In some embodiments of the disclosed method configuring may relate to joining an existing SRRD broadcasting group. In other embodiments of the disclosed method configuring may relate to forming a new SRRD broadcasting group. Additionally or alternatively, configuring the group may further comprise choosing a standardized wireless protocol to enable exchanging audio content between two, three or more sound recording and/or reproduction devices SRRDs in the SRRD broadcasting group. Preferably, the standardized wireless protocol is implemented according to the Bluetooth® Low Energy wireless standard. For example, one SRRD can act as a master or central device of the SRRD broadcasting group.

In embodiments, the SRRD broadcasting group will also configure time periods for that SRRD broadcasting group. Configuring time periods can be part of a protocol for establishing a SRRD broadcasting group. Time periods may be configured by the use of a communication standard. By defining and exchanging time periods, each of the SRRD in the formed group will have configuration or control data about receiving data from other SRRDs and/or transmitting data to other SRRDs in the group.

In embodiments of the methods/systems, time periods are configured that may define a temporal length of the audio frame of sampled audio data. In preferred embodiments, the configured time periods comprise or form intervals for consecutive broadcasting/receiving by the SRRDs in a SRRD broadcasting group. Dependent on the number of the members of the group, the length of the time period can decrease or increase. For example, if one SRRD acts as a master or central device of the SRRD broadcasting group, that master can set the overall timing. The clock in the SRRD of the first user may be the master clock. The other SRRDs synchronize their clocks accordingly.

Configuring an SRRD broadcasting group according to the invention may include establishing a sequential broadcasting order of the SRRDs in the SRRD broadcasting group. The sequential broadcasting order may define the order of broadcasting and/or receiving audio content of the SRRDs participating in the SRRD broadcasting group. The sequential broadcasting order can be shared with some or all participating SRRDs in the SRRD broadcasting group. Preferably, the sequential broadcasting order comprises different time slots, whereby the time slots are allocated to one or more of the SRRDs in the SRRD broadcasting group.

In embodiments, for the SRRD broadcasting group an interval is set at 5 ms. Within that 5 ms interval, four sequential times slots are allocated to the broadcasting by four respective SRRDs. The broadcasting according to the sequence is repeated every interval of 5 ms. The length of the interval can change over time. The number of slots in an interval can vary, e.g. dependent on the number of SRRDs in the group.

After configuring a broadcasting group of SRRDs, the method may further comprise different steps that may be performed repeatedly to exchange audio and allow reproduction thereof, e.g. at some or at each of the SRRD in the group. In the below, numbered steps are discussed that may be performed repeatedly to exchange audio and allow reproduction thereof. In case of a short repetition time, also referred to as configured time period or interval, audio data can be repetitively captured and subsequently shared, wherein the latency of reproduction is in the order of 1-2 times the repetition time, e.g. 10 ms. This advantage is explained more in detail below.

During a first step, some or all of the participating SRRDs of the SRRD broadcasting group may be provided with audio data containing audio content. Obtaining the audio data, or in embodiments pick-up data at the SRRD, can comprise processing, filtering, compressing, noise reduction, enhancing, sampling, etc. In embodiments, the audio reproducing allows reproduction of the original audio content or something close to similar.

During this first step, a recording device of some or all of the SRRDs may capture and/or pick up and/or record audio content. The audio content can originate from the user and/or the environment of the SRRD. Known digital audio recording can be implemented to convert the audio content into audio data. In embodiments the audio data may be provided to the SRRD in sampled form. E.g. the SRRD can be connected, via a further Bluetooth connection, to an external microphone. In some embodiments no live audio content may be received by some of the SRRDs in the SRRD broadcasting group and/or the recording device of one (or more) SRRD in the group is not operating. The provided audio content may be processed to be transmitted as the payload of the radio packets.

During a second step, one, two or some or all of the SRRDs in the SRRD broadcasting group broadcast one or more radio packets comprising the audio data from the first step. These radio packets may be implemented according to a standardized wireless protocol to insure interoperability with a range of other wireless and wearable devices. Preferably, radio packets implemented according to the Bluetooth® Low Energy wireless standard may be used for broadcasting the received audio content.

In embodiments, one or more broadcasting SRRD are provided with audio data and broadcasts the audio data. Within the methods and systems disclosed herein, the broadcasting SRRD refers to a SRRD within the broadcasting SRRD group that provides audio data and broadcasts. The broadcasting SRRD can be one, two or more or all of the SRRDs in the broadcasting SRRD group. Broadcasting according to the invention comprises transmitting from one, two or more broadcasting SRRD(s) to other SRRD(s) in the group.

In embodiments, a reproducing SRRD receives broadcasted radio packets with audio data and reproduces the received audio data. Within the methods and systems disclosed herein, the reproducing SRRD refers to a SRRD within the broadcasting SRRD group that receives broadcasted radio packets with audio data and reproduces the received audio data. The reproducing SRRD can be one, two or more or all of the SRRDs in the broadcasting SRRD group. An SRRD in the SRRD broadcasting group can be part of the broadcasting SRRDs and of the reproducing SRRDs. Any specific SRRD in the broadcasting group can broadcast (as a first SRRD) its radio packets and receive (as a second SRRD) radio packets from one or more other SRRDs. Preferably at least two broadcasting SRRDs broadcast their respective audio data in radio packets. Preferably at least two other reproducing SRRDs receive the broadcasted radio packets.

During a third step, the one, two, some or all of the reproducing SRRD(s) in the SRRD broadcasting group will receive the broadcasted radio packets. Accordingly, one or more reproducing SRRDs in the group may receive radio packets that comprise the audio data from one, two or more first SRRDs in the SRRD broadcasting group. In this way audio content from broadcasting SRRDs is shared with reproducing SRRDs in the group. Broadcasting the audio data will be received by one or more reproducing SRRDs thereby making the broadcasted radio packets available locally in the one or more reproducing SRRDs.

As a result of the three steps, audio data from broadcasting SRRD(s) is broadcasted and received at the reproducing SRRD(s). In embodiments, two, three or multiple broadcasting SRRDs share their audio with two, three or multiple reproducing SRRDs. As a result, the reproducing SRRDs receive the audio data of the first SRRD(s). In a preferred embodiment each SRRD in the group is a broadcasting and reproducing SRRD. In that preferred embodiment each SRRD shares its audio content with all other SRRDs in the group, resulting in the live reproduction of all combined audio content of each respective SRRD at each other SRRD.

During a fourth step, the one, two, three or more or each reproducing SRRD in the SRRD broadcasting group may process the received radio packets to reproduce the audio content. Reproducing comprises converting the received radio packets to obtain the audio content therefrom. Further reproducing can comprise known techniques to convert that received audio data into audible signals.

When radio packets are received from two or more broadcasting SRRDs in the SRRD broadcasting group, then the audio data can be mixed at the receiving SRRD to reproduce combined audio content from the two or more broadcasting SRRDs. During reproducing, received radio packets from broadcasting SRRDs in the broadcasting group can be combined to reproduce the combined audio content of broadcasting SRRDs at the same time. The sounds picked up at two broadcasting SRRDs may be broadcasted and received at the reproducing SRRD and can then be reproduced to the user via a loudspeaker as a combined sound at that reproducing SRRD.

During the second step, the broadcasting SRRDs may broadcast said radio packets according to a sequential order, e.g. in accordance to allocated time slots. This allows sequentially broadcasting by broadcasting SRRDs. Only one SRRD is broadcasting at each moment in time. This allows use of a single channel, broadcasting with less disturbance and allows sequentially using the transceiver. At each reproducing SRRD, the broadcasted radio packets may then also be received sequentially. When a broadcasting SRRD in the group is performing the second step, one or more reproducing SRRDs in the SRRD broadcasting group may be simultaneously performing the third step.

In embodiments, the broadcasting by the broadcasting SRRDs in a group take place in consecutive time periods. These time periods may directly succeed one after the other. However, in some embodiments, the time periods may not directly succeed one after the other. The time periods which may not directly succeed one after the other may be interleaved with other time period which may or may not related to the disclosed method of exchanging audio content. All broadcasting SRRDs that are provided with audio data are allowed to broadcast in the configured time period/an interval. In that time period all reproducing SRRDs in the group then receive the broadcasted radio packets. New audio data can be captured and the broadcasting can then be repeated in a next configured period/interval. This allows repeated broadcast of renewed audio content, which in turn can be reproduced into a continuous feed. In embodiment the configured time period/interval can vary and can be adjusted, e.g. dependent on the number of SRRD in the group.

By configuring a group and having the broadcasting SRRDs repeatedly provide and broadcast audio content, the reproducing SRRDs in the group can repeatedly receive and reproduce the mixed audio content locally. By repeating the method in about 10 ms, latency of the local sound reproduction can be reduced to about a dozen milliseconds, which is hardly noticeable to the visible eye.

In embodiments audio content is continuously captured and the captured audio data is segmented. A segment of audio data contains a configured time period of audio content, e.g. a 5 ms sound bite. The broadcasting SRRD repeatedly broadcasts radio packets containing the sequential segmented audio data in consecutive configured time period. At the reproducing SRRD the received audio data can be reconstructed in a continuous feed of audio content from the broadcasting SRRD. At the broadcasting SRRD original audio data is picked up. The original audio data can correspond with a length in time, e.g. 10 ms. At the broadcasting SRRD, the original audio data is segmented, e.g. by the processor, into at least two segments. From the two segments the full original audio data can be reproduced. A segment of audio data contains a time portion of the original audio content, e.g. 6 ms or 5 ms or contains data that corresponds to a part of the original audio data. In the repeated steps of the invention, one segment is broadcasted and subsequently, in the next cycle of the repeated steps of the invention, the second segment is broadcasted. The first segment is sent in a first time period and the second segment is sent in a subsequent second time period of the repeated method steps of the SRRD broadcasting group. In embodiments the first segment is sent before the second segment is picked-up. At the reproducing SRRD, the two segments are received in the repeated steps of the method. In the first time period, the reproducing SRRD is receiving and audio processing the first segment. The segments, together or separately, can be processed and reproduced so that the (full or close to) original audio content is reproduced. Accordingly, the method and devices of the invention allow picking-up audio spanning several of the repeated time periods of the method and sending and receiving that audio in segments. As a result, at a more or less continuous audio feed can be provided and reproduced by the reproducing SRRD of the audio that is continuously picked up at the broadcasting SRRD. The segments of the original audio data can be post-processed before being broadcasted. The post-processing may be compression, filtering, noise-reduction, or any technique known in the art which improves the data transmission or data quality while still allowing the segments to restore and reproduce the, full or close to, original audio content at the reproducing SRRD.

In embodiments, the disclosed systems and methods provide SRRDs, each having a processor, a transceiver and a loudspeaker and/or microphone. The transceiver may comprise a transmitter and/or receiver. The loudspeaker and/or microphone may be implemented separately on different sub-devices of said SRRDs. For example, a cell phone comprising a microphone can be combined with a headset comprising a loudspeaker to form an SRRD. Alternatively, in some embodiments a cell phone and a headset can also be seen as two separate SRRDs. The SRRD can be used by one or more users to perform the different methods described herein.

In embodiments, the processor can configure the SRRD broadcasting group via the transceiver. Preferably, the processor forms and/or joins the SRRD broadcasting group via the transceiver during configuring the SRRD broadcasting group. As already stated, in some embodiments the processor may configure the SRRD broadcasting group by forming a new SRRD broadcast group by sending control data via the transceiver. In other embodiments the processor may configure the SRRD broadcast group by joining an existing SRRD broadcast group by receiving control data from the transceiver.

In embodiments, the processor may further be used for some or all of the different steps which may be performed repeatedly in this method. The processor can also receive radio packets via the transceiver. Control data and/or radio packets containing audio data can be sent and/or received by the transceiver and processed by the processor. Control data allow forming or joining the SRRD broadcasting group.

For example, in case the microphone is provided, the processor is provided with the live audio content picked up by the microphone of the SRRD. The processor can then arrange the broadcasting thereof, making that SRRD part of the broadcasting SRRDs in the group. In an SRRD that only has a microphone (lacking a loudspeaker) the processor may be arranged to only broadcast radio packets via the transceiver.

In case a loudspeaker is provided, that SRRD can be a reproducing SRRD and the processor can be configured to process the received radio packets from one or more broadcasting SRRDs. The processor can convert the radio packets into signals that can be reproduced audible by the loudspeaker. In embodiments of an SRRD having only a loudspeaker, the processor may be arranged to only receive radio packets via the transceiver.

In embodiments, at the reproducing SRRD, the audio data from the two or more broadcasting SRRDs in the SRRD broadcasting group can be multiplexed into a single combined audible signal for the user. This way the user hears, with a reduced latency, sounds from broadcasting SRRDs. The audio content may be reproduced in the second SRRD using audio processing techniques known by the person skilled in the art.

In embodiments, the audio processing at reproducing SRRDs of the received audio data may be time staggered with respect to audio processing of the received audio data in another reproducing SRRD. For example the audio processing of the received audio content at one SRRD may be performed before or after the time audio processing at another SRRD.

In embodiments, the broadcasting of one or more radio packets of the methods disclosed herein can further comprise rebroadcasting one or more received radio packets with audio content from one or more other broadcasting SRRDs. After receipt of broadcasted radio packets with audio data from a first broadcasting SRRD, that audio data from that first broadcasting SRRD is rebroadcasted by the second broadcasting SRRD that received the audio data. Also the receiving reproducing SRRD can rebroadcast the received data packets. This results in double broadcasting of the audio data of the first broadcasting SRRD. This increases the chance of broadcasted radio packets with audio data of the first broadcasting SRRD being received by all group members.

Preferably, (re-)broadcasting one or more radio packets comprises broadcasting, preferably in a single payload, of one or more radio packets comprising the audio content of the broadcasting SRRD and the received one or more radio packets from a previously broadcasting SRRD in the broadcasting group, wherein the received one or more radio packets comprise audio content from the previously broadcasting SRRD. By introducing rebroadcasting one or more received radio packets with audio content from a previously broadcasting SRRDs, the method according to the invention may be become robust. This may be especially helpful in a challenging environment for exchanging audio content. For example an environment where multiple barriers may be situated in between the broadcasting SRRDs in the SRRD broadcasting group.

To clarify this embodiment, the following example may be given. Suppose that the SRRD broadcasting group comprises of three SRRDs. A broadcasting SRRD broadcasts radio packets with audio data. A barrier prevents receipt at a reproducing SRRD. However the radio packets were receive by a third SRRD that is arranged to rebroadcast the radio packets with audio data from the broadcast SRRD. The reproducing SRRD may then have another opportunity for receiving the radio packets of the broadcasting SRRD by listening to the radio packets from the third SRRD. Preferably, the third SRRD broadcasts a radio packet which comprises in a single payload both the audio content from the third device and the received audio content from the broadcasting SRRD. In this example, the third SRRD is a broadcasting and reproducing SRRD.

The configuring, preferably forming and/or joining feature, of the SRRD broadcasting group of the previous described embodiments may further be specified. The configuring feature may further comprise configuring a sequential broadcasting order for SRRDs in the SRRD broadcasting group. The sequential broadcasting order indicates the order in which the broadcasting SRRDs in the SRRD broadcasting group are to broadcast radio packets comprising the audio data.

In embodiments the steps of providing audio data, broadcasting, receiving and reproducing are repeated. The steps can be repeated in a configured time period. By repeating the sequential broadcasting in the configured time period, the live audio content of broadcasting SRRDs in the group may be shared with the reproducing SRRDs.

In embodiments, configuring the SRRD broadcasting group further comprises configuring one or more channels and/or frequency for broadcasting. A channel may be a wireless connection between two or more SRRDs of the SRRD broadcasting group over which audio content may be exchanged. A channel is not limited to a set frequency or band.

Preferably, a frequency hopping sequence may be chosen, preferably as one of the steps of configuring the SRRD broadcasting group. By choosing a frequency hopping sequence each packet may be sent on a different frequency carriers according to a frequency hopping sequence to which the SRRDs (both the receiving and/or broadcasting) may be synchronized. Frequency hopping relate to rapidly changing the carrier frequency among many distinct frequencies to avoid interference with the environment and/or eavesdropping.

Moreover, during configuration, the method may further configure frequency hop parameters and security parameters. These parameters may relate to broadcasting and/or receiving radio packets according to the chosen communication protocol. The frequency hop parameters may define the frequency hopping sequence. Known communication protocols to the person skilled in the art can be implement here.

Additionally or alternatively, the method may further configure one or more broadcast channels. These broadcast channels may be created and/or obtained. In some embodiments, a slave SRRD may receive from a master SRRD information of the broadcast channels. In other embodiments, a SRRD may set and thereby create the broadcast channel by itself.

Preferably, the one or more broadcast channels are direct and/or unidirectional broadcast channels. A direct broadcast channel has no additional component which may be interleaved between two or more SRRDs of the SRRD broadcasting group which make use of the channel. By having a direct channel, the overall latency of the method can be reduced. A unidirectional channel has a well-defined direction of broadcasting. More preferably, the method according to the previous embodiments may configure one or more short-range broadcast channels, for broadcasting between two or more SRRDs in the SRRD broadcasting group. Short-range may be defined by the chosen communication protocol.

The channel of the method according to the embodiments discussed herein may further have a frame structure in the time domain, preferably with a fixed interval corresponding to the configured time period.

Additional to any of the disclosed embodiments or a part of a separate aspect, pairs of SRRDs may be created. A broadcasting SRRD broadcasts its data packets. A SRRD paired with the broadcasting SRRD receives radio packets from the broadcasting SRRD. The paired SRRD rebroadcasts the received radio packets of the broadcasting SRRD. One SRRD can be a member of different pairs of SRRDs. Preferably sequential SRRDs in a sequential order of the broadcasting SRRD group are paired. The directly previously broadcasted data packets are rebroadcasted in the subsequent time slot. This keeps the latency reduced while providing redundancy.

In embodiments, configuring the SRRD group comprises synchronizing the transceiver of a reproducing SRRD to the reception and broadcasting of radio packets by the broadcasting SRRD. By sharing the expected broadcasting periods of the SRRDs, the SRRDs will 'know' when to listen to an expected signal comprising radio packets with audio from other SRRDs.

In embodiments, the SRRD may comprise of two components, such as separate earpieces worn in the left and right ear, each with its own short-range radio. In embodiments at least one of both earpieces of the SRRD has a processor, transceiver and a loudspeaker. Supplemental robustness can be achieved by further providing that the two or more or each components of the SRRD pick-up and/or broadcast and/or receive and/or audio process and/or reproduce the audio content received from the broadcasting SRRDs for a single user.

The method may further comprise preferably that one component of the SRRD rebroadcasts received radio packets and another component of that SRRD receives the rebroadcasted received radio packets.

Additionally or alternatively in embodiment, after receiving broadcasted radio packets at the first component of the SRRD the method may further comprise sending at least one Audio Received (ARX) message to the second component, the method further comprising the second component of the SRRD either (1) receiving the ARX message from the first component of the SRRD, or, (2) in case no ARX is received from the first component, sending the received broadcasted radio packet to the first component of the SRRD.

Additionally or alternatively, the two or more components that form the SRRD in the present embodiment may be allocated two or more time slots in the sequential broadcast order. As example, the SRRD may comprise of two independent components in the form of earpieces. These may be worn on the left and right ear, each with its own short-range radio. Further robustness may be obtained by applying a diversity mechanism. This may be achieved by exploiting a wireless link directly between the left earpiece and right earpiece, the ear-to-ear link. If a broadcast message may not be received by the left (or right) earpiece, the left (or right) earpiece requests a forwarding of the right (or left) earpiece to the left (or right) earpiece over the air-to-ear link, resulting in receive diversity. Retransmission of previously received broadcast audio can also be provided by any of the left or right earpieces, resulting in transmit diversity.

Accordingly, aspects of the method of exchanging audio content may relate to providing direct, wireless, short-range communications between one or more SRRDs of a least two users. The one or more SRRDs form a SRRD broadcasting group that can exchange audio content and/or data messages among themselves. The participants may sequentially broadcast radio packets on a common channel shared by all participants in range. Each SRRD receiving the broadcasted radio packets may forward a part of the received radio packets. In the reproducing SRRDs, received audio data from broadcasting SRRDs may be combined and provided as an audio signal to a loudspeaker in the SRRD.

The present disclosure of the invention also relates to the described methods herein which may relate to one single SRRD.

In embodiments, the methods described herein may further comprise providing a bi-directional private link between two SRRDs and broadcasting radio packets by the SRRD over the bi-directional private link; and/or the transceiver of the SRRD transmitting radio packets to a concurrent service and/or receiving radio packets from a concurrent service, preferably on a different broadcast channel, wherein the concurrent service is preferably a music service.

According to an aspect, a device for exchanging audio content is provided. The device comprises a set of instructions that cause the device to perform any of the methods discussed herein.

In one embodiment, the device may comprise a transceiver and a processor. The processor of the device may be connected to the transceiver and may be arranged to perform one or more of the features of one or more of the methods discussed herein. As example, the processor may configure, preferably form and/or join, the SRRD broadcasting group of two, three or more (SRRDs). Additionally or alternatively, the processor may configure time periods for the SRRD broadcasting group.

In further embodiments, the processor may be configured to perform different steps which may be performed repeatedly. For example, the processor may receive, e.g. by picking up or recording, audio content. The processor may broadcast, via the transceiver, one or more radio packets that comprise the audio content. The processor may additionally or alternatively receive, via the transceiver, one or more radio packets comprising audio content from one, two or more other SRRDs in the SRRD broadcasting group. The processor may further audio process the received radio packets comprising audio content from one, two or more other SRRDs to allow subsequent reproduction of the audio content.

According to another embodiment, the device may further be an SRRD, whereby the device further comprises a microphone configured to pick up a live audio content and/or a loudspeaker configured to reproduce audio content. The microphone of the device in this embodiment may be arranged to pick up the live audio content. The processor of the device in this embodiment may be arranged to receive the live audio content from the microphone.

Additionally or alternatively the loudspeaker of the device may be connected to the processor to receive the reproduced audio content for reproduction at the loudspeaker.

In embodiments, a headset having one or more of the methods discussed herein implemented thereon may be provided. In other embodiment a legacy headset can be connected to a mobile device that runs an application that performs the method. The legacy headset, forming the loudspeaker and/or microphone of the SRRD with the mobile phone, can then be used in a method according to the invention.

According to further aspects of the invention, a device may be provided for setting up the exchange of audio content. The device can for example be a phone with one or more applications. The device may comprise a transceiver and a processor. The processor may be connected to the transceiver. The processor may be arranged to set up an SRRD broadcasting group of two, three or more devices (SRRDs). Preferably, the processor may configure time periods for the SRRD broadcasting group as is discussed in the multiple embodiments described herein. The processor may also set up a sequential broadcasting order for the SRRD broadcasting group indicating the order of broadcasting of data by each of the SRRDs in the SRRD broadcasting group. Accordingly a device, like a headset or a mobile phone, can operate as a master device of a SRRD group for several SRRDs.

In embodiments, the processor can further be arranged to allow a SRRD to join or leave an existing SRRD broadcasting group and may update the sequential broadcasting order.

Additionally or alternatively, the device may further be arranged to communicate frequency hopping and/or time periods of an SRRD Broadcasting group to two or more SRRDs.

According to yet another aspect, a method is provided that allows sharing data with limited latency over a wirelessly connected group of devices. The data can be live data, such as audio. The devices can be SRRDs. The method comprises configuring a broadcasting group of two, three or more wireless devices and setting a broadcasting channel for the broadcasting group. This allows configuring the group. As part of the method a sequential broadcasting order may be configured for broadcasting of the three or more wireless devices. The sequential broadcasting order sets an order of when the devices in the group can broadcast. Preferably the sequential broadcasting order sets sequential consecutive, preferably interleaved, time periods in which a single device can broadcast (and the others will receive the broadcasted radio packets). According to the method the devices then sequentially broadcast one or more radio packets that comprise the data. By sequentially broadcasting, defined time periods are configured during which the data may be shared over the group and can be received by all other group members.

In embodiments, the broadcasting of one or more radio packets may further comprise broadcasting radio packets which comprise in a single payload audio content from the first device and audio content from a second device that was received via broadcasting from a second device in the broadcasting group. This allows rebroadcasting of previous broadcasted data, resulting in a more robust method.

A further aspect of the invention relates to a method of sharing or exchanging data between two, three or more data sharing and/or reproduction devices (DSRDs). The data that is shared or exchanged comprises experience data that can be reproduced and thereby experienced by the user of the DSRD. The disclosed method of sharing or exchanging data may enable the different users of DSRDs to use the same shared data as other users with reduced latency. Data from one, two, three, more or each broadcasting DSRD, e.g. video data or augmented reality data, can be shared by broadcasting with other one, two, three or more or each reproducing DSRDs via a direct channel between the broadcasting DSRD and the reproducing DSRDs in a DSRD group. It will be clear that throughout this application this further aspect can be read into every disclosed embodiment herein, where a SRRD device/method/group is disclosed.

Methods and systems comprising three or more DSRDs can be provided. Broadcasting DSRDs share data. The data is preferably sequentially broadcasted within the group. The broadcasting and receiving is repeated allowing to form a group with shared data that can be reproduced with reduced latency.

According to yet a further aspect, methods and devices are provided that form a broadcasting group wherein data packets received from a broadcasting device is (re-)broadcasted by a broadcasting device. In embodiments one broadcasting DSRD broadcasts data from provided at the DSRD and rebroadcast previously received data from another broadcasting DSRD. This aspect can be combined with any of the embodiments disclosed herein.

According to further aspects a computer-readable non-transitory storage medium and a computer program product are provided that comprise executable instructions to implement one or more of the methods discussed herein.

The above and the following presents a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

BRIEF DESCRIPTION OF THE DRAWINGS

The present invention will now be described more fully hereinafter with reference to the accompanying drawings, showing several embodiments of the invention. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Electronic devices, such as mobile phones and smartphones, are in widespread use throughout the world. Although the mobile phone was initially developed for providing wireless voice communications, its capabilities have been increased tremendously. Modern mobile phones can access the worldwide web, store a large amount of video and music content, include numerous applications ("apps") that enhance the phone's capabilities (often taking advantage of additional electronics, such as still and video cameras, satellite positioning receivers, inertial sensors, and the like), and provide an interface for social networking. Many smartphones feature a large screen with touch capabilities for easy user interaction. In interacting with modern smartphones, wearable headsets are often preferred for enjoying private audio, for example voice communications, music listening, or watching video, thus not interfering with or irritating other people sharing the same area. Because it represents such a major use case, embodiments of the present invention are described herein with reference to a smartphone, or simply "phone" as the host device. However, those of skill in the art will readily recognize that embodiments described herein are not limited to mobile phones, but in general apply to any electronic device capable of providing audio content.

Figure 1:
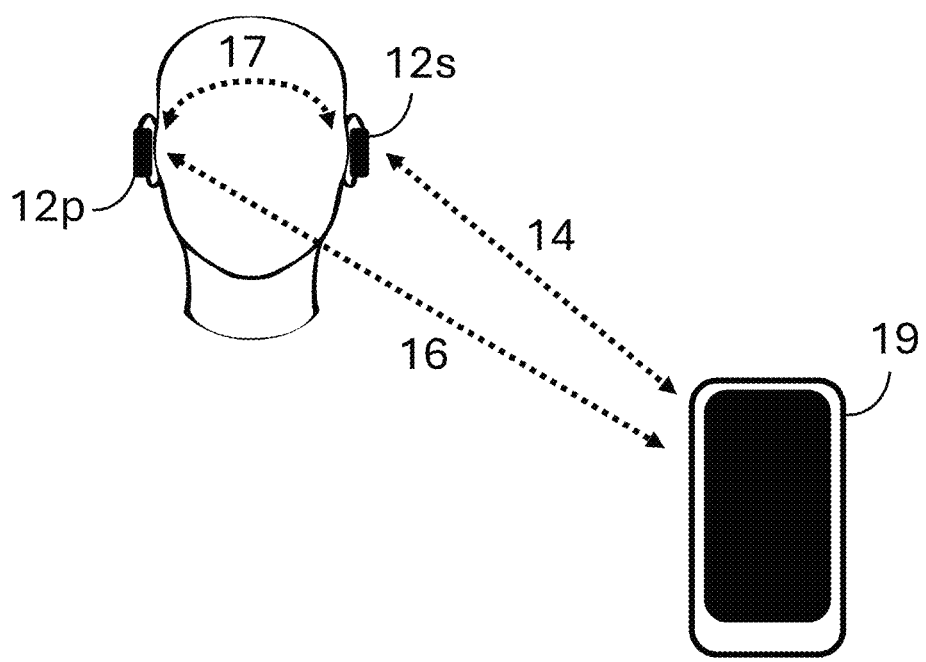
FIG. 1 shows a high-level block diagram of an exemplary use scenario of a user wearing a wireless stereo headset and wirelessly receiving and sending audio content from and to a host device, respectively.

FIG. 1 depicts a typical use case 10, in which a host device 19, such as a smartphone, comprises audio content which can stream over wireless connection 14 and/or 16 towards the right earpiece 12p and/or left earpiece 12s of the headset 12. Headset 12 can comprise of two separate earpieces, or the earpieces may be connected via a string, which may be insulating or conducting. Communication between the earpieces 12p, 12s (ear-to-ear or e2e communications) is provided via connection 17 which can be wired or wireless. For professional use, headset 12 may comprise of only a single earpiece for mono communications, mainly for voice applications. Headset 12 may have means to prevent environmental sound to enter the user's ear, either passively or actively (the latter via so-called Active Noise Cancellation or ANC techniques). Headset 12 may have means to improve the hearing capability of the user by applying amplification and/or equalization of environmental sound.

According to the current disclosure, the smartphone in combination with the earpieces forms a sound recording and/or reproduction device (SRRD). However, the smartphone can is, by itself also form an example of a SRRD. The headset 12 formed by separate earpieces 12p, 12s, can, by itself also form a SRRD.

In embodiments, the smartphone or hosting device, has or can receive instructions in the form of an application, to allow the smartphone to operate according to any of the embodiments of the invention.

Figure 2:
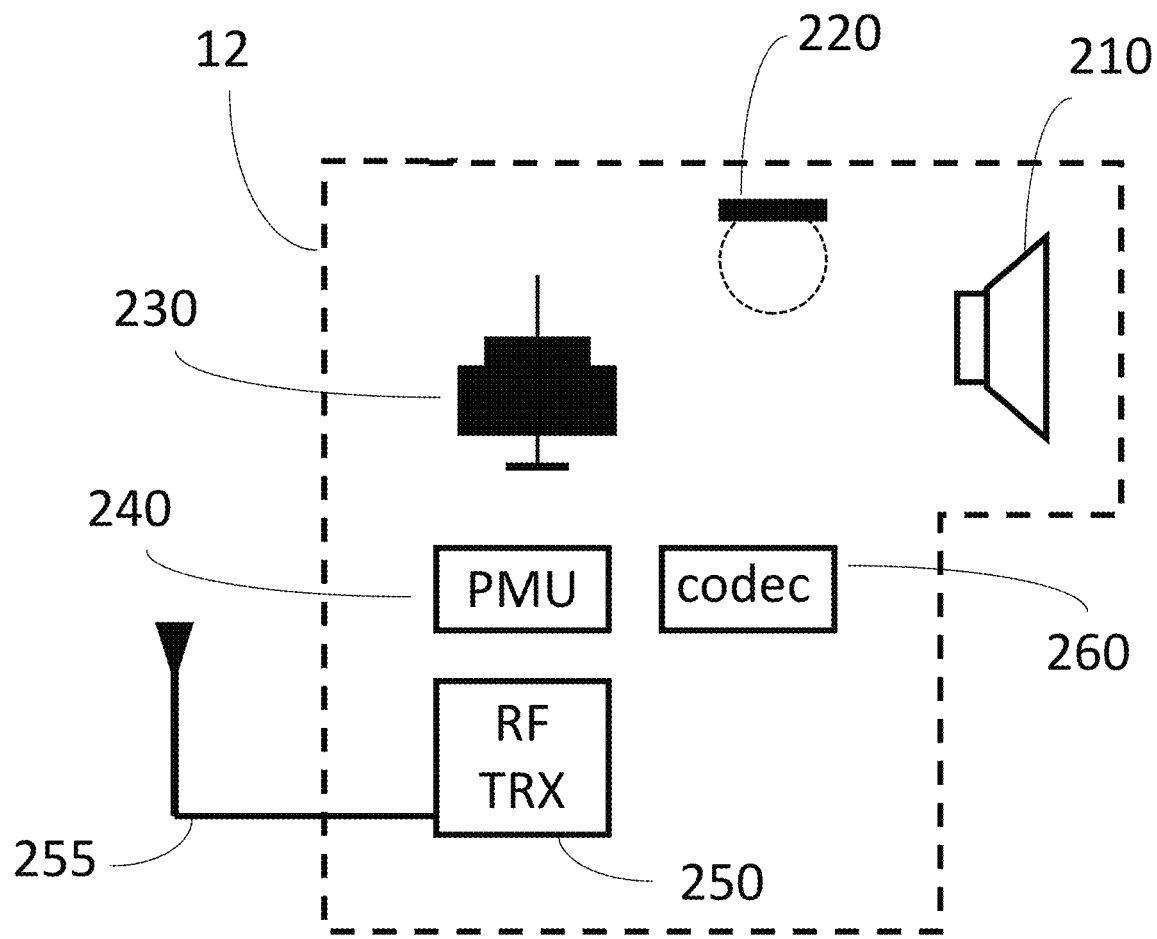
FIG. 2 is a block diagram of an exemplary wireless stereo headset earpiece.

FIG. 2 depicts a high-level block diagram 200 of an exemplary wireless earpiece 12p or 12s according to embodiments of the present invention. Earpieces 12p and 12s may comprise of substantially the same components, although the placement within the earpiece (e.g. on a printed circuit board) may be different, for example mirrored. Alternatively, only one earpiece 12p has a radio transceiver 250, microphone 220, codec 260, Power Management Unit (PMU) 240, and battery 230, whereas both earpieces 12p and 12s have a loudspeaker 210. Audio information received by the radio transceiver 250 in one earpiece 12p may be processed and then forwarded, for example over a wire, to the other earpiece 12s.

Wireless communication between the phone 19 (or any other host device) and the headset 12 is provided by an antenna 255 and a radio transceiver 250. Radio transceiver 250 is a low-power radio transceiver covering short distances, for example a radio based on the Bluetooth® wireless standard (operating in the 2.4 GHz ISM band). The use of radio transceiver 250, which by definition provide two-way communication capability, allows for efficient use of air time (and consequently low power consumption) because it enables the use of a digital modulation scheme with an automatic repeat request (ARQ) protocol.

Transceiver 250 may include a microprocessor (not shown) controlling the radio signals, applying audio processing (for example voice processing such as echo suppression or music decoding) on the signals exchanged with the host device 19, or may control other devices and/or signal paths within the earpiece 12. Alternatively, this microprocessor may be a separate circuit in the earpiece, or maybe integrated into another component present in the earpiece. Accordingly the microprocessor and the transceiver can transmit and receive control signals and radio packet containing data.

Codec 260 includes a Digital-to-Analog (D/A) converter, the output of which connects to a loudspeaker 210. For embodiments that include a voice mode, the codecs 260 may further include an Analog-to-Digital (A/D) converter that receives input signals from microphone 220. To obtain beamforming for enhanced voice pickup, more than one microphone 220 may be embedded in one earpiece, then also requiring additional Analog-to-Digital (A/D) converters in the codec 260. Alternatively, digital microphones may be used, which do not require A/D conversion and may provide digital audio directly to the microprocessor.

Power Management Units (PMU) 240 provide stable voltage and current supplies to all electronic circuitry. Finally, the earpiece is powered by a battery 230 which typically provides a 3.7V voltage and may be of the coin cell type. The battery 230 can be a primary battery, but is preferably a rechargeable battery.

In case of a stereo headset with two earpieces additional components may be present to support the communication link 17 between earpieces 12p and 12s. This link may be wired, using analog or digital signals, or this link may be wireless. A wireless link may use magnetic coupling, for example applying Near-Field Magnetic Induction (NFMI). A suitable transceiver is the NFMI radio chip Nx2280 available from NXP Semiconductors of The Netherlands. Alternatively, an RF radio link can be used, for example reusing the radio transceiver 250 that also connects the earpieces 12p and 12s to the host device 19. Time Division Multiplexing (TDM) may be applied to allow the radio transceiver 250 to alternately switch between a link to the host device 19 and the e2e link 17 to the other earpiece.

Figure 3:
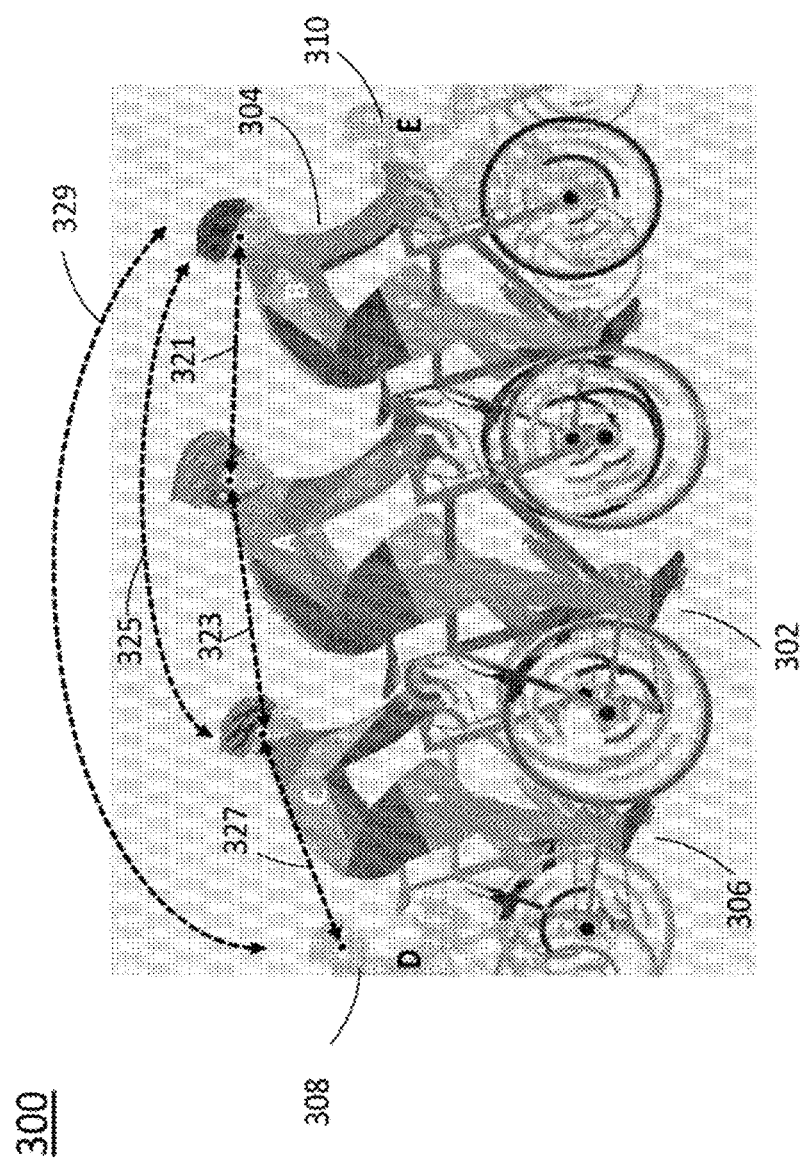
FIG. 3 is an example of a group of people using wireless headsets that directly communicate with each other.

According to one embodiment, the radio transceiver 250 in one headset may also be used to directly communicate wirelessly with a radio transceiver 250 in another headset. An example of a use scenario where wireless connections are established between multiple headsets is shown in FIG. 3. Depicted are five cyclists A to E (302, 304, 306, 308, 310), each using a SRRD, such as headset 12. Alternatively and/or additionally, their headsets may be connected to their (smart) phones to receive incoming calls and/or listen to streaming music, the smartphone and headset together forming a SRRD.

Figure 4:
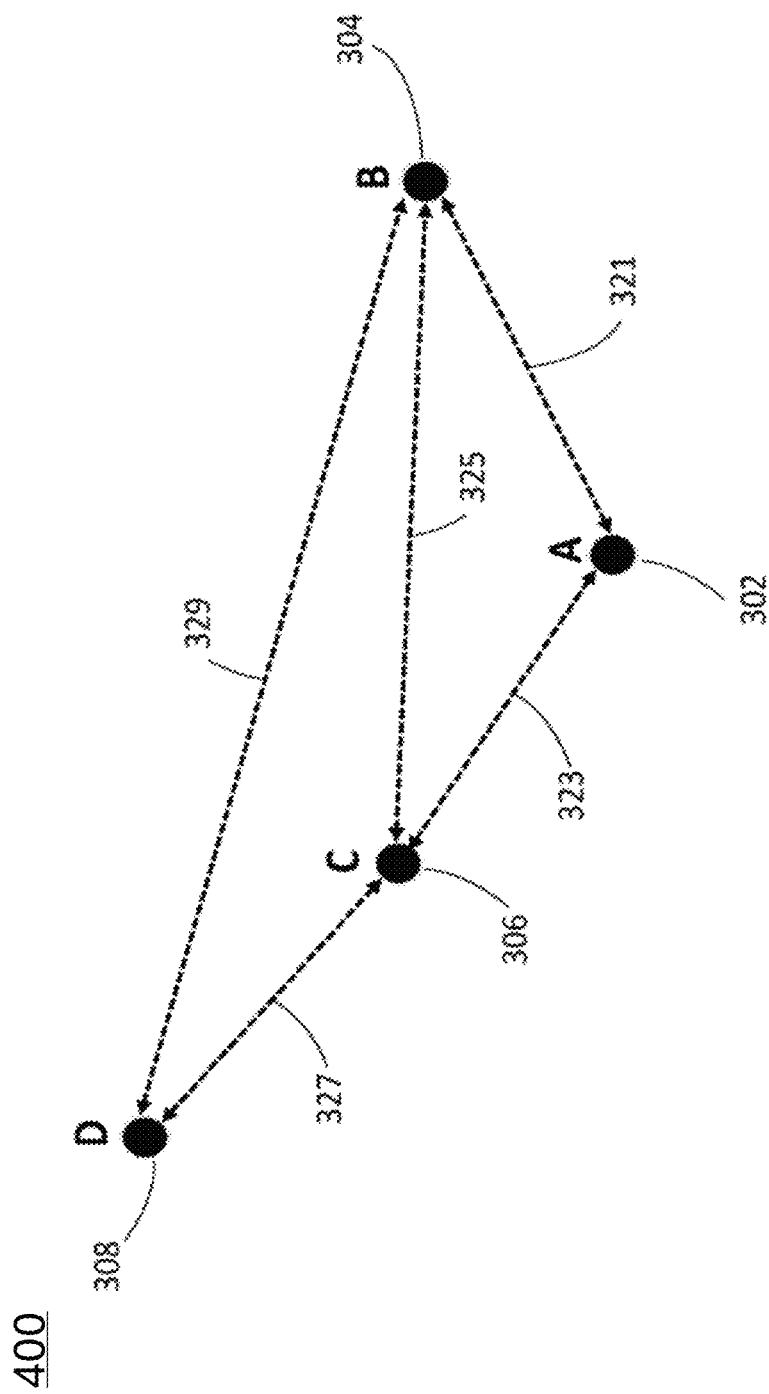
FIG. 4 is a mesh network, representing the wireless connections in the group shown in FIG. 3.

Although cyclist E 310 may be in range, in this example he is not part of the group. Wireless links 321, 323, 325, and 327 may be considered to form a wireless mesh network as shown in FIG. 4. In this example, users A (302), B (304) and C (306) can directly communicate with each other using wireless links 321, 323, and 325; user D (308) can only communicate with user C (306) using link 327, and with user B (304) using link 329. In this example, user D (308) cannot communicate directly with user A (302). This may be caused by a range problem, or by the fact that the body of user C (306) is blocking the radio signals between user A (302) and user D (308), so called shadow fading.

Cyclists A to D, i.e. 302, 304, 306 and 308 have already configured an SRRD broadcasting group, such that they can communicate with each other using wireless links 321, 323, 325, and 327. Configuring a group can comprise forming the group and/or joining an existing group. Control data can be exchanged by the devices to configure the group and to share group properties such that each SRRD has the relevant group properties. For establishing the SRRD broadcasting group different protocols are available. Any combination of protocols can be used to establish a group, e.g. by sharing an identification ID.

The headsets preferably make use of a standardized wireless protocol to insure interoperability with a range of wireless and wearable devices from different vendors, used in various parts of the world. The most widely adopted protocol for wireless (mono and stereo) headsets is the Bluetooth wireless protocol. The Bluetooth protocol makes use of packet radio in a time-slotted fashion and applies frequency hopping. This means that each packet is sent on a different frequency carrier according to a pseudo-random hopping sequence to which both the transmitter and receiver are synchronized.

Figure 5:
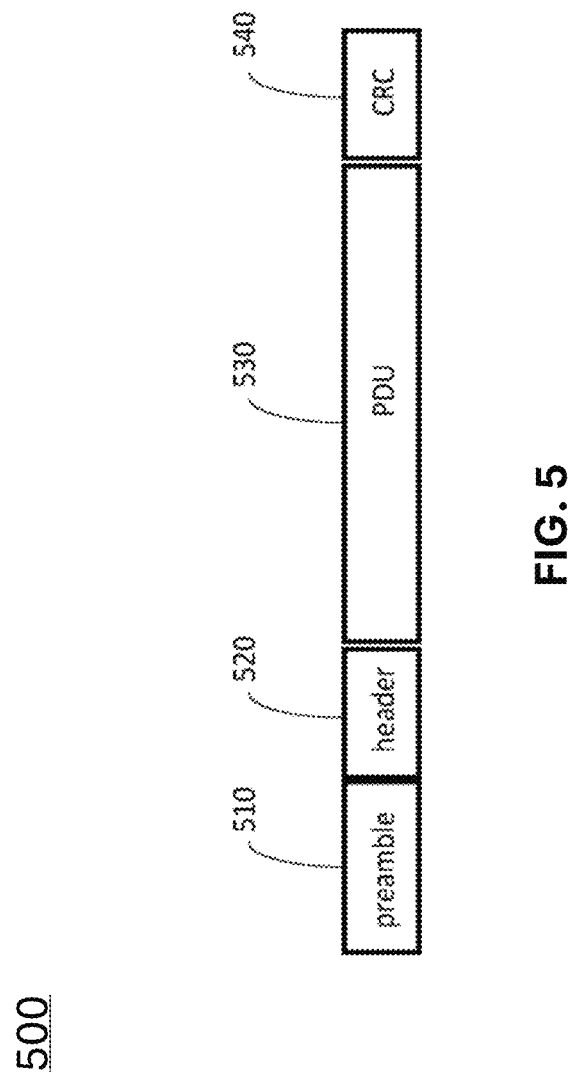
FIG. 5. is an example of a radio packet as used by the Bluetooth® wireless standard.

An example of a typical Bluetooth packet 500 is shown in FIG. 5. The packet may comprise of a preamble 510, a header 520, a Protocol Data Unit (PDU) 530, and a Cyclic Redundancy Check (CRC) 540. The preamble 510 may train the receiver to obtain proper frequency synchronization and symbol timing. The preamble 510 may further comprise a unique identifier that identifies the wireless connection (such as an access code or an access address). The header 520 may include an indication what type of PDU is used (for example whether Forward Error Correction FEC is applied), how many time slots are covered by the packet (which is a coarse indication of the packet length), and may include information about an Automatic Retransmission Query (ARQ) scheme like sequence numbers and ACK/NACK information. The PDU 530 typically comprises the payload with the audio information. It may include a length indicator, providing the exact number of bits carried in the payload. The receiver can check the received packet for errors using the CRC or another checksum 540.

Figure 6:
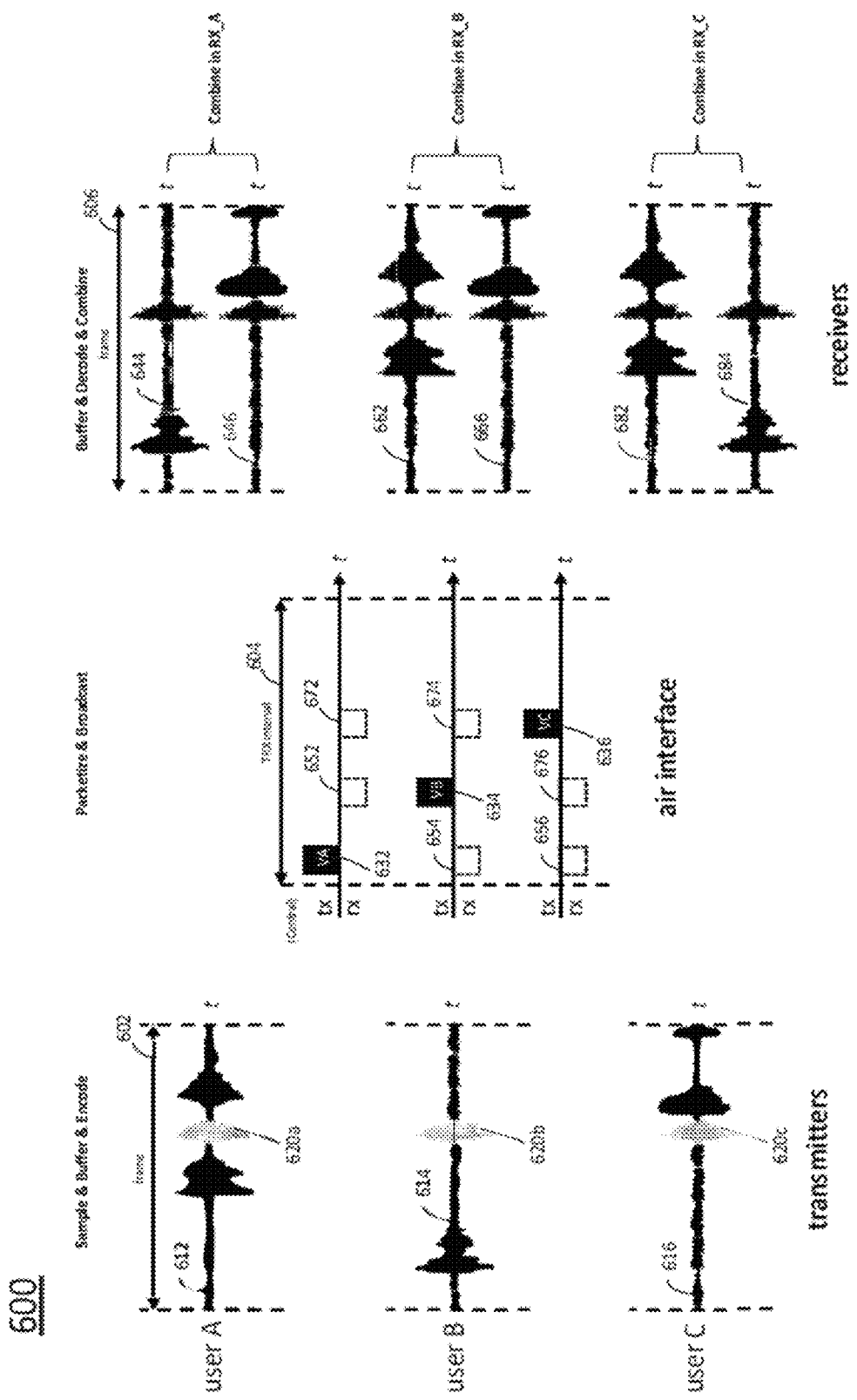
FIG. 6 shows audio data in a first embodiment while processed in the transmitters, sent wirelessly in packets over the air, and processed in the receivers of the headsets shown in FIG. 3.

FIG. 6 depicts several steps of providing audio data at a broadcasting SRRD of the SRRD broadcasting group comprising of user A (302), B (304), and C (306). For simplicity, the audio processing in user D is omitted, but follows along the same lines. In the left part, it is shown how in each transmitter, the voice signal of a user is digitized and buffered. Analog signals provided by the microphone 220 are, for example, sampled at 8000 to 16000 samples per second, and represented by a digital word, for example using Pulse Coded Modulation (PCM).

The voice signal 612 of user A (302) is divided into audio segments of fixed frame length 602, for example 3.75 ms, 5 ms, or 10 ms. Voice, sampled by user A (302) microphone 220 during the duration of the segment, is digitized. The microphone in the headset of user A will pick up the voice signal 612 of user A but may also pick up sounds 620a from the environment (which may also be the voices from the other users). For user B (304), the voice signal 614 will be different, but the environmental sound 620b picked up by the microphone in the headset of user B (304) may be similar to environmental sound 620a picked up by the microphone in the headset of user A (302). Likewise, the voice signal 616 is picked up by the microphone in the headset of user C (306), together with environmental sound 620c. The digitized voice segment is subsequently encoded in a voice codec 260 (vocoder) and placed in a packet 500 that can be sent over the air. For example a wideband speech vocoder like LC3 can be applied.

In the example embodiment, voice segments 612, 614, 616 are encoded in each headset transmitter separately and sequentially broadcast over the wireless channel using radio packets VA (632), VB (634), and VC (636) which may use the packet format 500 as depicted in FIG. 5. The radio transceivers 250 in the headset transmitters of users A, B, and C use a fixed TRX interval 604 with a duration substantially equal to the audio frame length 602. Interval 604 and audio frame length 602 are examples of time period configured as a part of the SRRD broadcasting group.

In embodiments where one SRRD is formed by hosting device and headset, the headset first sends the picked audio content to the hosting device. The hosting device receives the audio content.

In embodiments, the order of broadcasting during a time frame is set (or time dependent varied) for that group. Here the order is A, B and then C. The respective transmitters of the SRRDs in the group have received instructions to schedule their respective transmissions such that no collisions occur on the air interface. In this example, user A broadcasts packet VA (632) first, followed by user B broadcasting packet VB (634), and finally user C broadcasting packet VC (636). By broadcasting the radio packets, the other SRRDs can receive the broadcasted radio packets and their content.

In embodiments, one SRRD transmitter can act as master or Central device for configuring the SRRD broadcasting group, comprising setting the overall timing; for example, the clock in the headset of user A may be the master clock. The other SRRDs (at users B and C) synchronize their clocks using the timing of received packet VA 632 and schedule their transmissions accordingly; a staggered timing scheme results to prevent collisions between packets VA (632), VB (634), and VC (636) sent by respective broadcasting SRRDs. Frames and TRX intervals are repeated, such that a continuous stream of voice packets is sent over the air at a specific (preferably low) duty cycle.

User A (302), operating as, and as an example of, a reproducing SRRD, will receive voice packets VB (634) and VC (636) broadcasted by broadcasting SRRDs. The receiver of user's A headset will pick up the signals during receive windows 652 and 672, respectively. It will process the packets and can subsequently retrieve the audio content 644 (including the voice signal 614 and the environmental sound signal 620b) from packet VB (634), and the audio content 646 (including the voice signal 616 and the environmental sound signal 620c) from packet VC (636) using a decoding process in the voice codec 260.

In further steps of the method, the digital audio signals (using PCM and sampled at 8000 or 16000 samples per second) are subsequently combined, and then converted to an analog signal using an A-to-D converter that drives the loudspeaker 210 in user's A headset. Note that special care should be taken to add signals 644 and 646 such that the environmental sound parts in 644 and 646 (originated from 620b and 620c) substantially align and no echo is experienced.

Similar procedures take place in the receivers of the reproducing SRRDs of users B and C, combining the audio data retrieved from packets VA (632) and VC (636), and the combining the audio data retrieved from packets VA (632) and VB (634), respectively. Although not shown, a receiver may mix a weak version of its own voice signal in the combination (so called sidetone generation).

The previously described air protocol uses a broadcast mechanism which is sequentially used by different participants of the SRRD broadcasting group. The broadcasted radio packets are received by multiple reproducing SRRDs of the group. In the mesh network representation individual links where depicted. For example, user B has a wireless link 321 to user A, a wireless link 325 to user C, and a wireless link 329 to user D. However, it should be understood that these three individual links 321, 325, 327 can constitute one unidirectional broadcast channel established during configuring of the SRRD broadcasting group. The channel allows radio packets to be broadcasted by user B and to simultaneously receive those packets by user A, user C, and user D (and any other receiver in range which is locked in time and frequency to this unidirectional broadcast channel). Likewise there is a unidirectional broadcast channel established by user C, etc.

Packets may arrive at a receiver erroneously. Whether there are errors may be detected using the CRC 540 in the radio packet 500. Additional forward-error-correcting (FEC) bits may be added to allow the receiver to identify and correct possible bits in error. Alternatively, or in addition, a retransmission scheme is applied where the transmitter resends the radio packet. Preferably this retransmission scheme is conditional, and only retransmissions happen when failures are reported by the receiver(s) to the transmitter. However, since in case of broadcast transmission, multiple receivers may experience different errors, reporting and requesting retransmissions by each receiver individually may become cumbersome. Instead, unconditional retransmission can be applied, i.e. each radio packets is resent once or multiple times without any feedback from the receivers.

Figure 7:
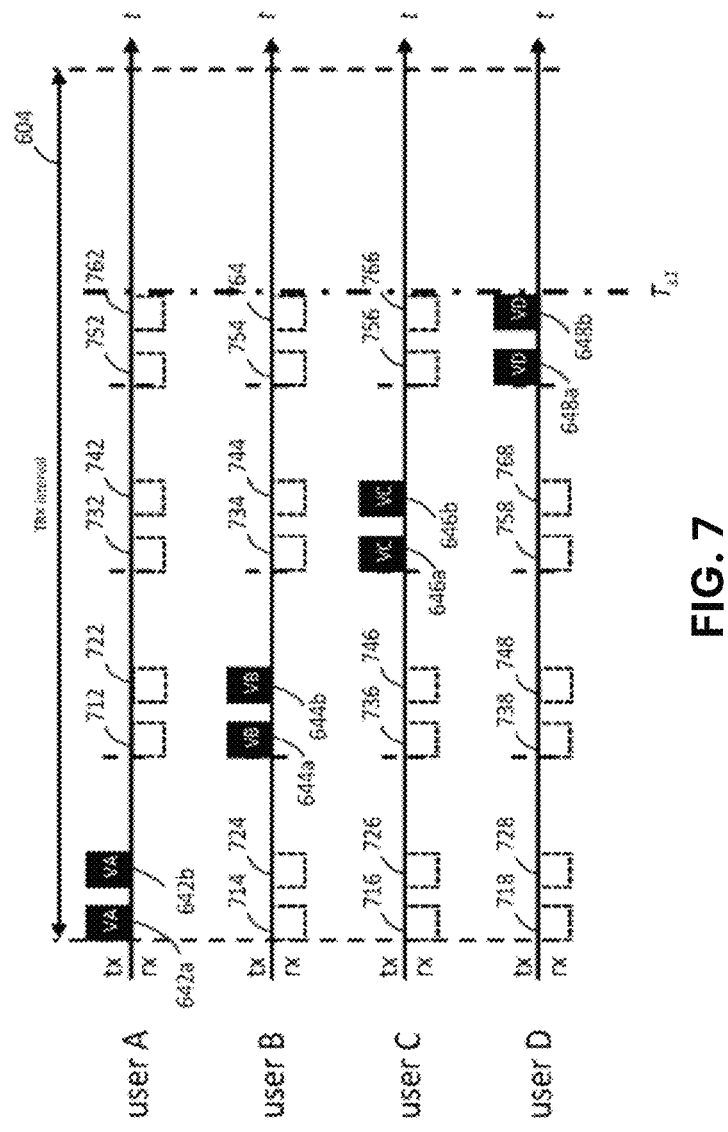
FIG. 7 is a data flow and timing diagram of a first communication protocol using one retransmission of each packet sent according to a first embodiment.

A possible retransmission scheme is shown in FIG. 7. The transmitter of user's A headset first broadcasts the audio data VA in packet 642a, directly followed by a retransmission of the same audio data VA in packet 642b.

Retransmission may also take place at a later point in time in the TRX interval 604. Preferably packets 642a and 642b are sent on different carrier frequencies, thus providing frequency diversity, which is beneficial in a multipath environment which may give rise to Rayleigh fading. If a receiver receives a packet successfully, it may skip activating the receiver for receiving following retransmissions. This may save power consumption. For example, if user C has received VA during RX window 716 successfully, it can de-activate the receiver until the next new packet reception (VB in RX window 736); i.e. it will not be active in RX window 726 to listen for a retransmission of VA. For the receiver to start the combining of the audio received from two or more users, all packets, including the retransmissions, must be received. This means, for example, that user C can only start combining the audio from packets VA, VB, and VD at Ts1 occurring after the last retransmission i.e. packet 648*b*.

Figure 8:
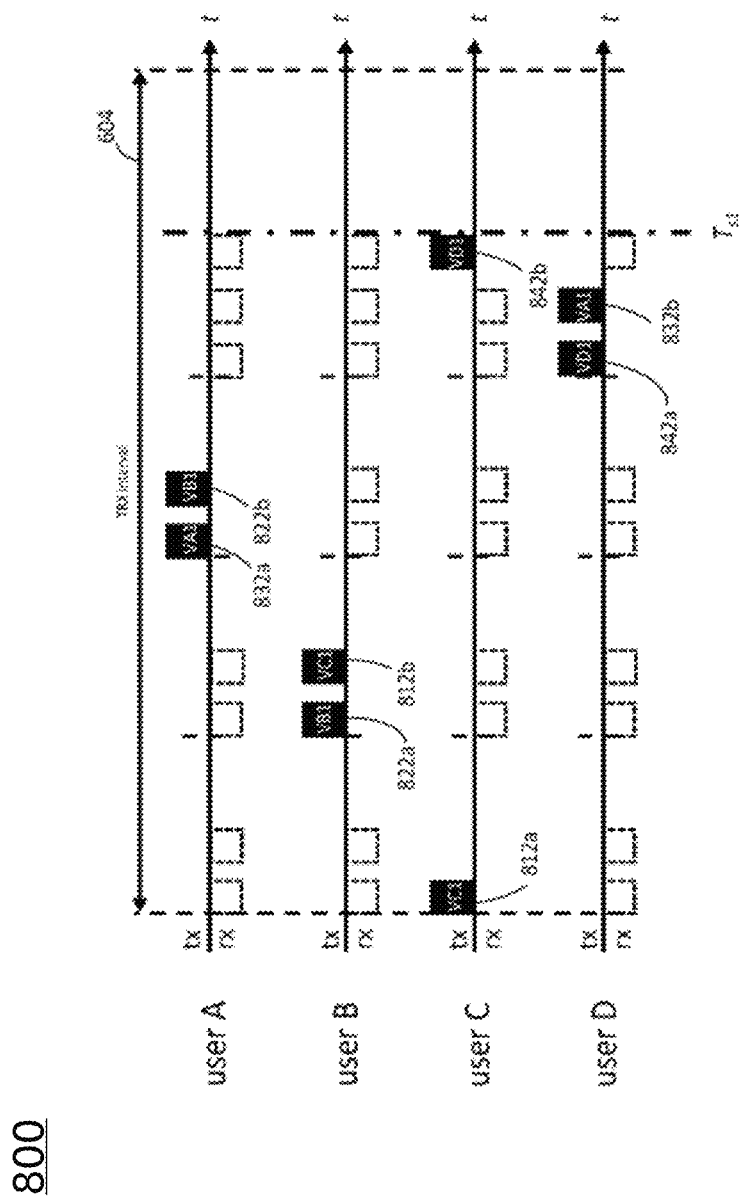
FIG. 8 is a data flow and timing diagram of a second communication protocol using one retransmission of each packet sent according to a first embodiment.

Although improving robustness considerably, the retransmission scheme shown in FIG. 7 will not solve the communication problem between user A and user D in the use scenario depicted in FIG. 3. Retransmissions by user A will probably still not arrive at user D; likewise, retransmissions by user D will not arrive at user A. The node forwarding of packets in mesh networks like FIG. 4 can be implemented. That is, a packet sent by user A can be retransmitted by user B (and/or retransmitted by user C). This effectively means that packets received in one mesh node are forwarded by another mesh node. A first example of a retransmission scheme where retransmission is occurring by forwarding by different nodes is shown in FIG. 8. This rebroadcasting effectively increases the reach of the short range radio transmission.

User C broadcasts the first packet 812*a* including audio VC1 (collected in the previous frame by user's C microphone). User B receives the packet 812 and will subsequently send radio packet 822*a* including audio data VB1 (collected in the previous frame by user's B microphone). In addition, user B will send an extra packet 812*b* comprising the audio data VC1 as received in previous packet 812*a* sent by user C. Audio data VB1 and VC1 are sent by user's A transmitter in two separate radio packets 822*a* and 812*b*. However, the audio data VB1 and VC1 could be jointly placed in the payload of a single packet sent by user B (not shown). User B's audio data VB1 is retransmitted (forwarded) by user A in packet 822*b*. In this example, user D is the last user to transmit. It will retransmit the audio data VA1 received in packet 832*a* in packet 832*b*. The audio data VD1 from user D is retransmitted by user C in packet 842*b*. Only after the reception of this last (retransmitted) at Ts1 can combining of VD1 take place, for example in the receiver of user A. With the scheme as shown in FIG. 8, packets broadcast by user A will arrive at user D and vice versa via an intermediate (user C), although user A is out of range of user D.

Figure 9:
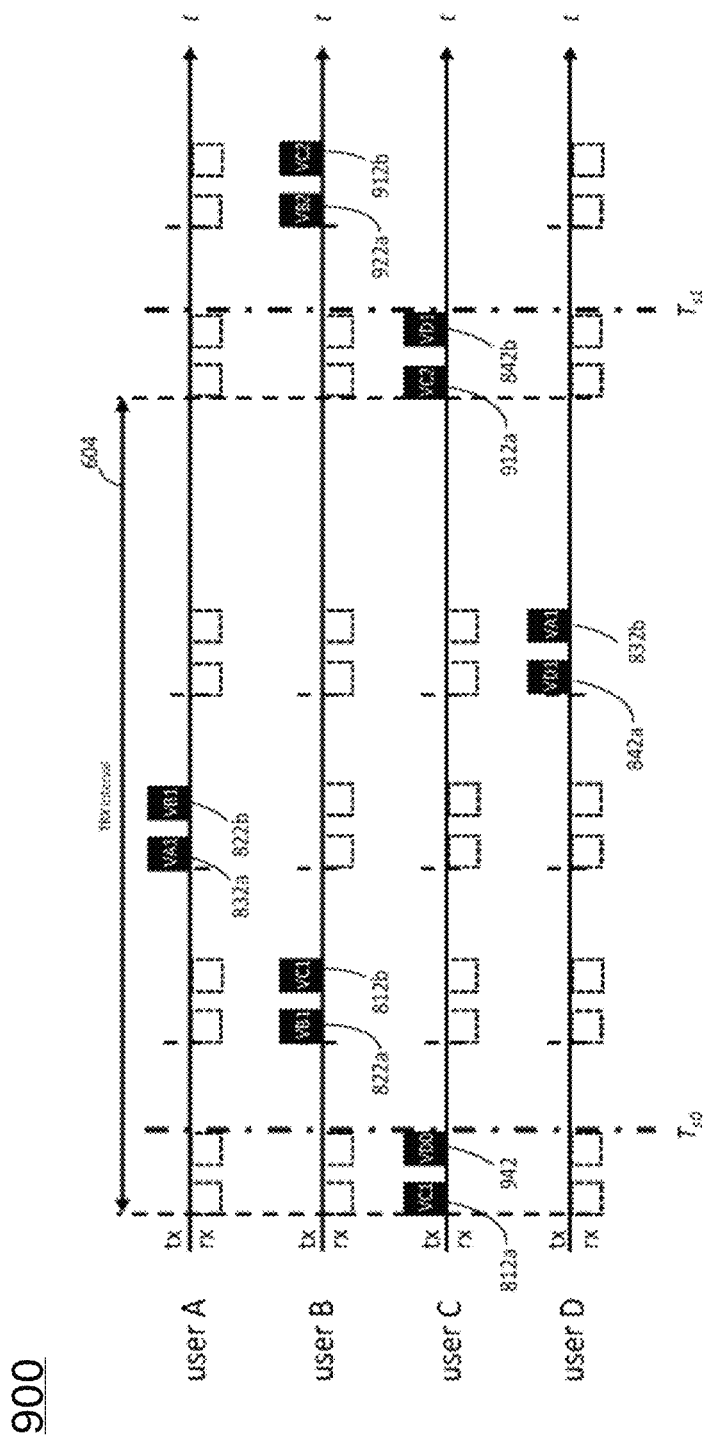
FIG. 9 is a data flow and timing diagram of a third communication protocol using one retransmission of each packet sent according to a first embodiment.

A disadvantage in the scheme of FIG. 8 is the special case of packet 824*b*. All users transmit their own voice data directly followed by a retransmission (in two consecutive radio packets or if possible combined in a single radio packet). But user C is an exception since it has to wait for the broadcast of user D. A more streamlined solution is shown in FIG. 9. In this case all transmitters follow the same mechanism transmitting first their own audio data directly followed by a retransmission of previously received audio data. The audio content VD0 from user D forwarded by user C in packet 942 is not from the previous frame, but from the frame before the previous frame.

The broadcasting and subsequent retransmission by broadcasting from a different node results in a more robust exchange of data, such as audio data at the costs of a slight latency increase.

Figure 10:
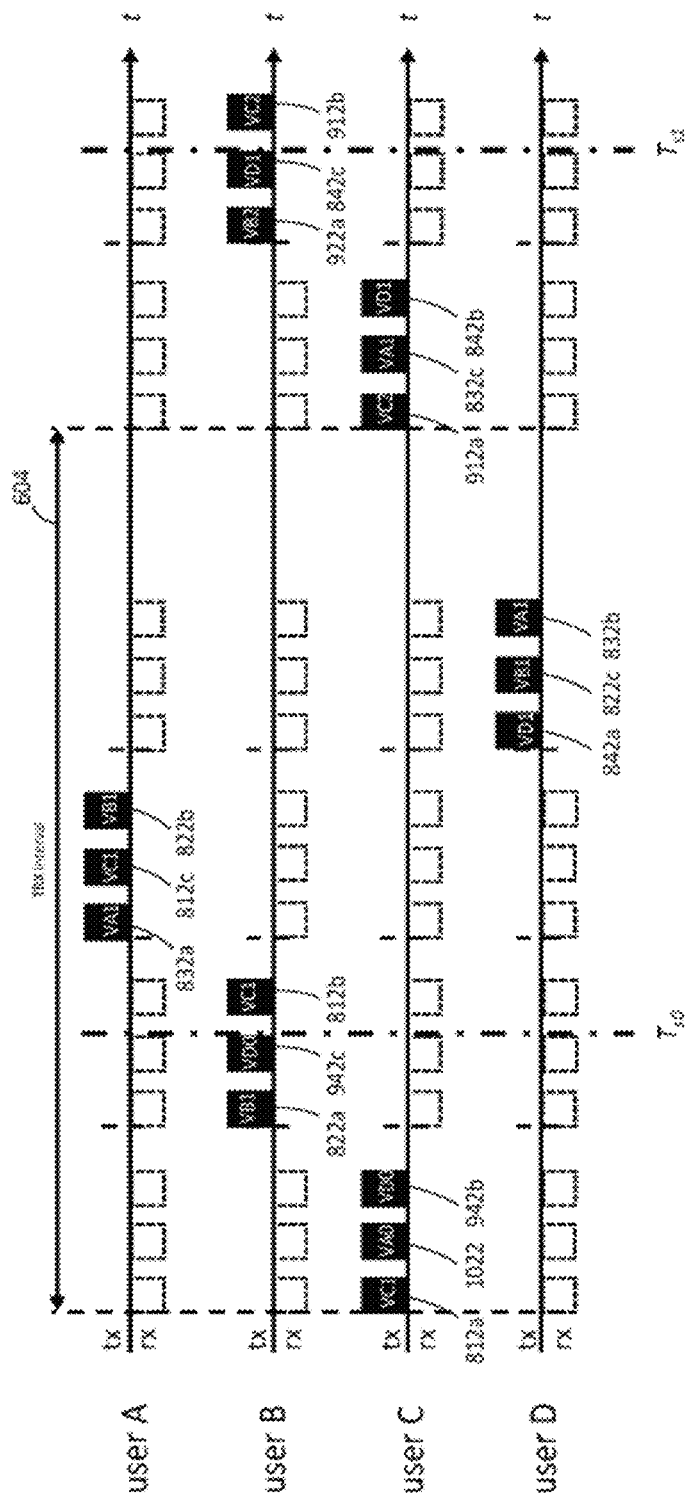
FIG. 10 is a data flow and timing diagram of a third communication protocol using two retransmissions of each packet sent according to a first embodiment.

The number of retransmissions (forwarding opportunities) can be extended. In FIG. 10, a single piece of audio data is retransmitted twice by different transmitters. User C broadcast VC1 first in radio packet 812*a*. This audio data is retransmitted by user B in 812*b* and retransmitted for a second time by user A in packet 812*c*. Combining of different audio signals associated with the same frame can only happen after the last retransmission with audio from that frame has occurred (e.g. for audio in frame 0 at Ts0 after VD0 in packet 942*c* has been broadcast, and for audio in frame 1 at Ts1 after VD1 in packet 842*c* has been broadcast). As mentioned before referring to retransmissions in FIG. 7, if a packet is received successfully, the receiver does not have to be activated in the RX windows when a retransmission is sent. For example in FIG. 10, if packet 822*a* (VB1) is received successfully by user A, user A does not have to activate its receiver to receive retransmissions of VB sent in packets 822*b* and 822*c*.

Figure 11:
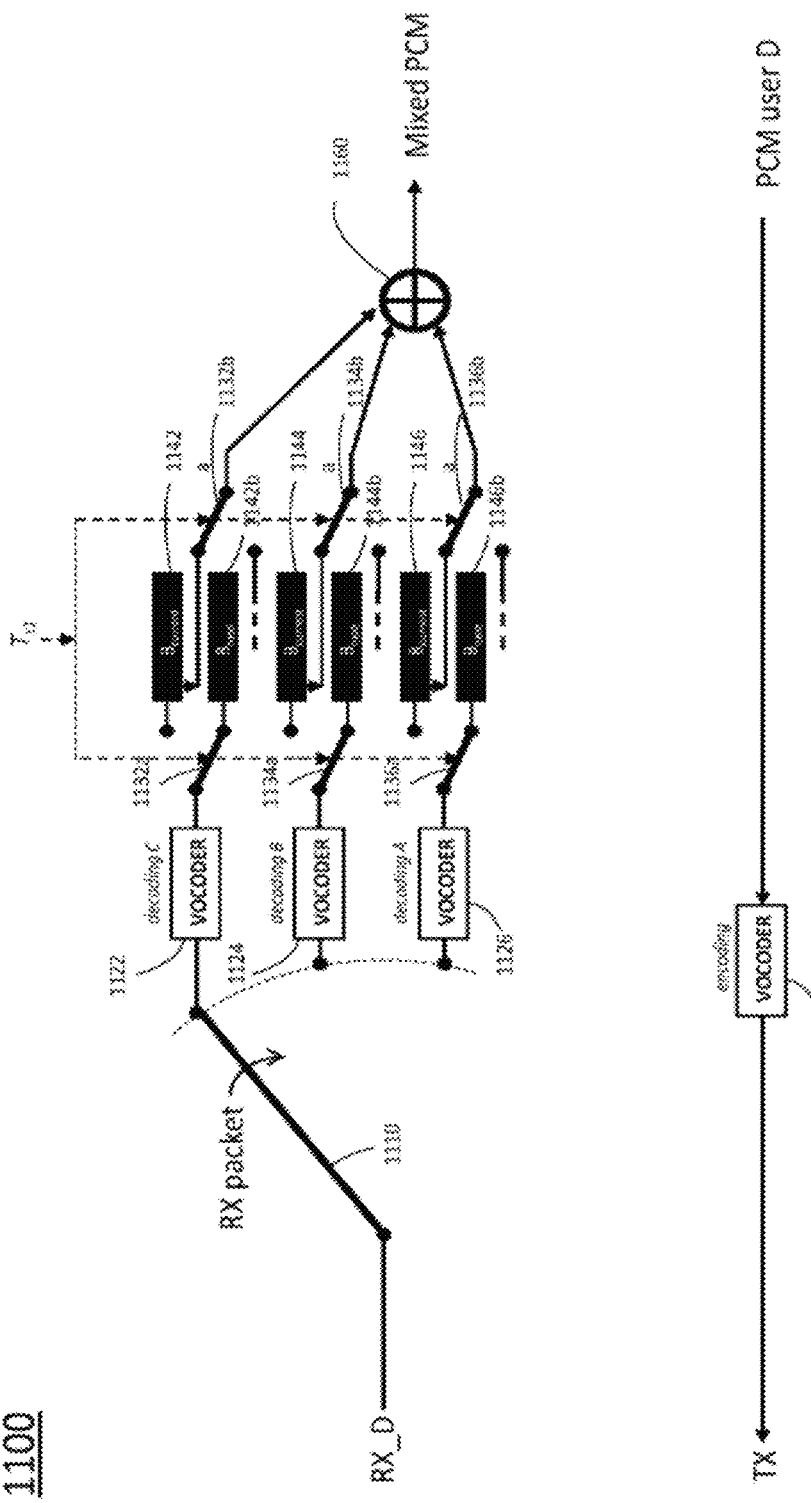
FIG. 11 is an example of receive buffer used in user D to receive various transmitted and retransmitted packets and combining voices from two or more participants according to a first embodiment.

A possible vocoder and buffer arrangement in the transceiver of user D is shown in FIG. 11. Packets VC, VB, VA are received sequentially and on arrival are provided to vocoders 1122, 1124, and 1126, respectively, for decoding purposes. The decoded signals (e.g. in PCM format) are buffered in next buffers 1142*b*, 1144*b*, and 1146*b* storing the next audio frame to be processed. The decoded PCM signals of the current audio frame have previously been stored in current buffers 1142*a*, 1144*a*, and 1146*a*. Pointers are pointing to sample locations in these buffers at the sample rate (e.g. 8000 or 16000 samples per second); the samples are read and combined (e.g. added in adder 1160, and possibly weighted before addition—not shown). The input switches 1132*a*, 1134*a*, 1136*a*, and the output switched 1142*a*, 1144*a*, 1146*a* are all switched at the same time at the point where the last audio data of the previous frame has arrived. Current buffers will then become next buffers (and overwritten with newly arrived audio frames), and next buffers will become current buffers the content of which will be read at the sample rate. At the switching time, the pointers will also be reset to read out the first location in the current buffer. In the transmit direction, only a single vocoder 1170 is present, encoding the audio signal picked up by the microphone of user D. The transceivers in the other users will have a similar arrangement, with a vocoder and current/next buffers for each participant in the SRRD broadcasting group. The buffer arrangement may also include audio data from the user itself. For example, in FIG. 11, audio data picked by the microphone of user D may also be placed in buffers (not shown) to be mixed with the other audio in adder 1160. This sidetone audio may be greatly attenuated before mixed with the audio of the other participants.

In the previous embodiment the mechanisms of which were explained in FIGS. 6 to 11, the frames in the transmitters and receivers, and the TRX intervals were all time aligned. Care was taken that (environmental) sounds 620 picked up by multiple microphones of multiple users were aligned in the receivers preventing echo effects. In time aligned embodiments, audio is picked-up and received at the processor during a first time period. During a second time period, the audio content is broadcasted by each SRRD and broadcasted radio packets are received by the other SRRDs in the group. In a subsequent time period, each SRRD combines the audio signals received and reproduces the audio contents for the user.

Figure 12:
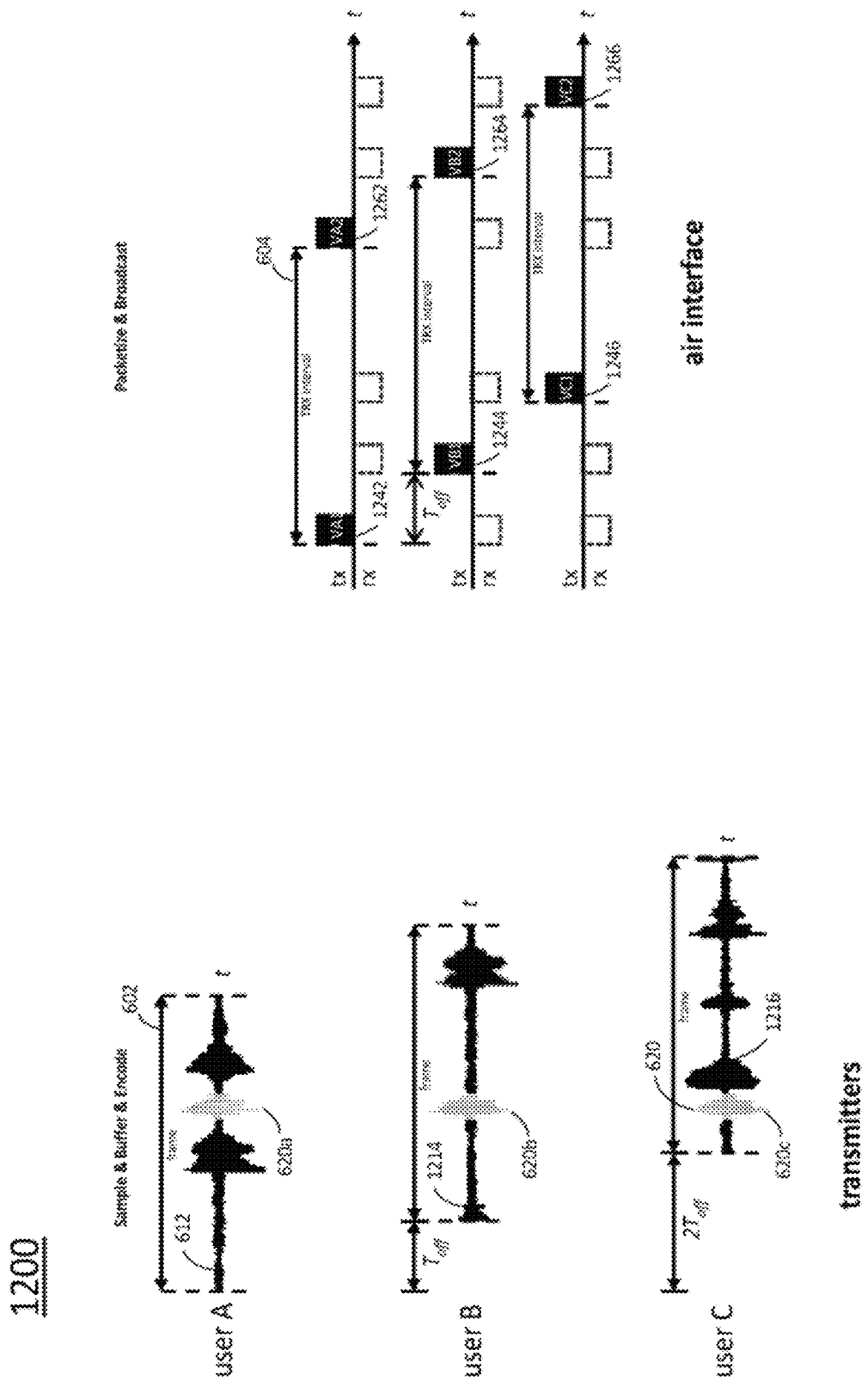
FIG. 12 shows audio data in a second embodiment while processed in the transmitters, sent wirelessly in packets over the air by the transmitters of the headsets shown in FIG. 3.

In a second embodiment, frames and intervals are time staggered while preserving the timing alignment of the environmental sounds 620. The time staggering of the frames in the transmitters, as well as the time staggering of the TRX intervals is shown in FIG. 12. Only three users A, B and C are shown. For each additional user, the frame 602, and corresponding TRX interval 604, is offset by an additional $T_{off}$. No retransmissions/forwarding's are shown, but they can be included in similar ways as presented in the first embodiment.

Figure 13:
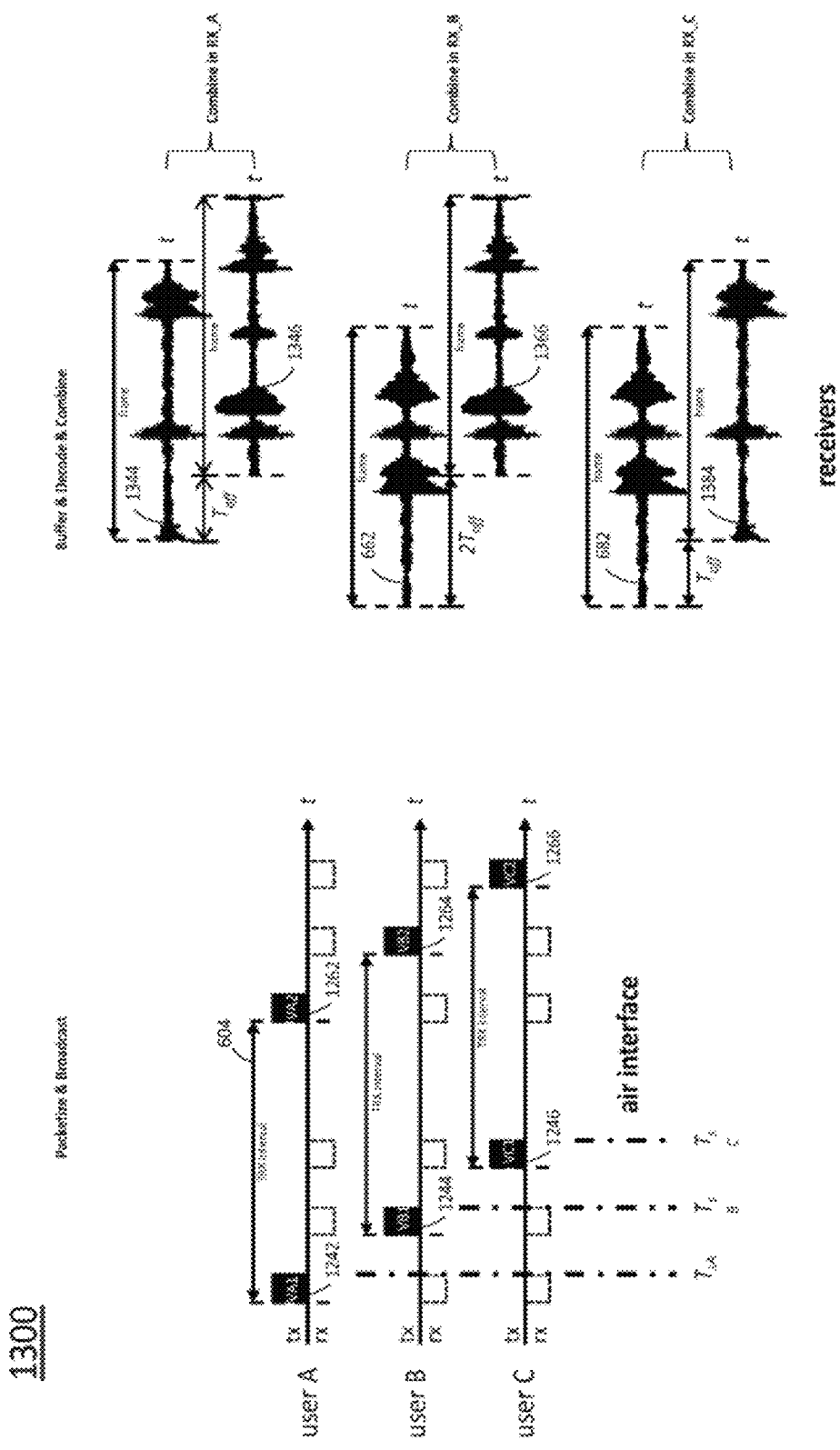
FIG. 13 shows audio data in a second embodiment while sent wirelessly in packets over the air, and processed in the receivers of the headsets shown in FIG. 3.
Figure 14:
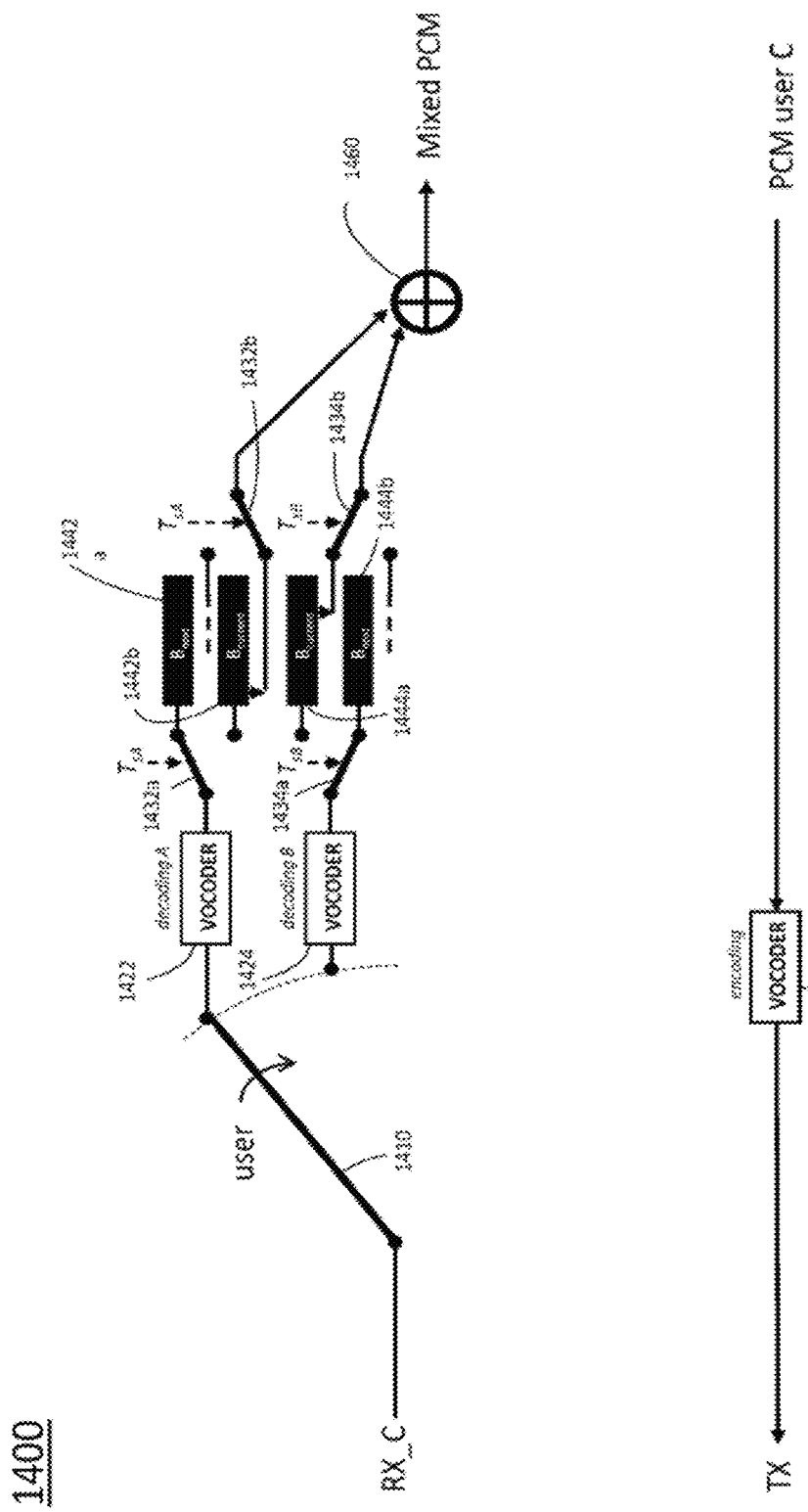
FIG. 14 is an example of receive buffer used in user C to receive various transmitted and retransmitted packets and combining voices from two or more participants according to a second embodiment.

When combining the audio streams of the different users, the time staggering has to be taken into account. If done properly, it will guarantee the time alignment of the environment sounds part resulting from 620. Note that the offset between user A and C is $2T_{off}$. This has to be taken into account when adding these two audio signals in the receiver of user B, see FIG. 13. A possible vocoder and buffer arrangement 1400 in the transceiver of user C for the second embodiment is shown in FIG. 14. It is similar to the arrangement of the first embodiment shown in FIG. 11 with the important difference that the input and output switched are not all switched in synchrony. Input switch 1432*a* switches when audio VA has arrived; input switch 1434*a* switches when audio VB has arrived. Furthermore, the pointers in the current buffers are time staggered and their reset is synchronized with the switching of the output switches. Between the pointers pointing to the current buffer for audio from user A and the current buffer for audio from user B there is a time difference of $T_{off}$ corresponding to the time staggering between user A and user B.

Based on the propagation conditions, the mutual timing between the participant may be arranged to optimize the retransmission of packets. For example, if in FIG. 15 user A (repeatedly) fails to receive packet 822*a* comprising VB1 from user B in RX window 1532, it will not be able to retransmit VB1. Assuming user D has successfully receives packet 822*a*, it would be better for user B and D to exchange their timing schedule. User D will then retransmit VB1 instead.

Figure 15:
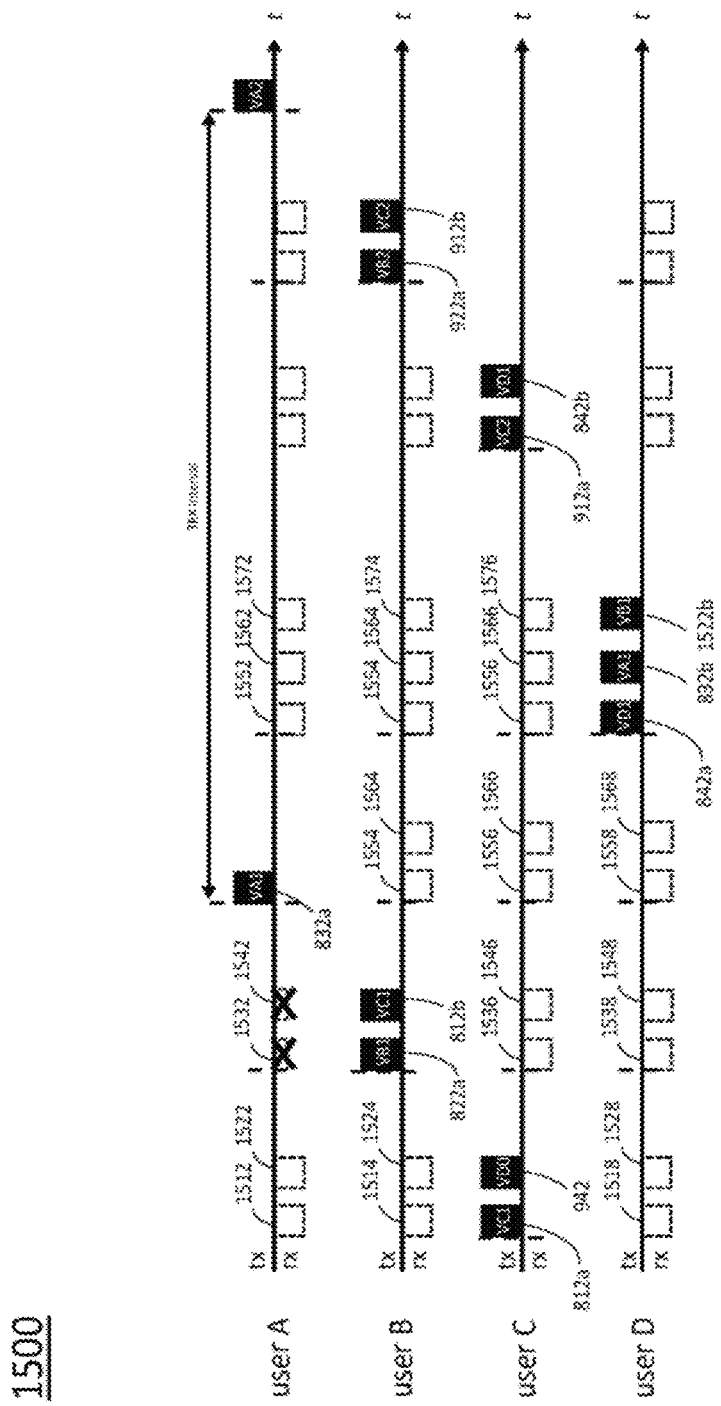
FIG. 15 is a data flow and timing diagram of a communication protocol where transmitters dynamically decide on retransmissions.

In optional embodiments, the mutual timing arrangements as well as the selection of the Central device role can be optimized using Received Signal Strength Indication (RSSI) measurements, and/or using other performance measures in the receiver like packet error rate, and/or be based on distance measurement capabilities. An alternative is to make retransmissions conditional. A transmitter takes the initiative to send a retransmission if a retransmission scheduled before has not occurred. This example is shown in FIG. 15 as well. User A misses the packets 822*a* and 812*b* broadcast by user B in RX windows 1532 and 1542, comprising audio data VB1 and VC1, respectively. As a result, user A will not be able to retransmit audio data VB1 as it was scheduled to do (see packet 822*b* in FIG. 9). Users B, C, and D will all notice that VB1 is not retransmitted (user B in RX window 1564, user C in RX window 1566, user D in RX window 1568). The next broadcast is for user D, and in addition to retransmitting VA1 in packet 832*b*, the transmitter of user D will take the initiative to retransmit VB1 in 1522*b* as well. Users A, B, and C can anticipate on this retransmission (as it was not done by user A) and activate additional RX windows 1572, 1574, and 1576. As a result, VB1 arrives at user A in RX window 1572 as it was missed in RX window 1532.

Figure 16:
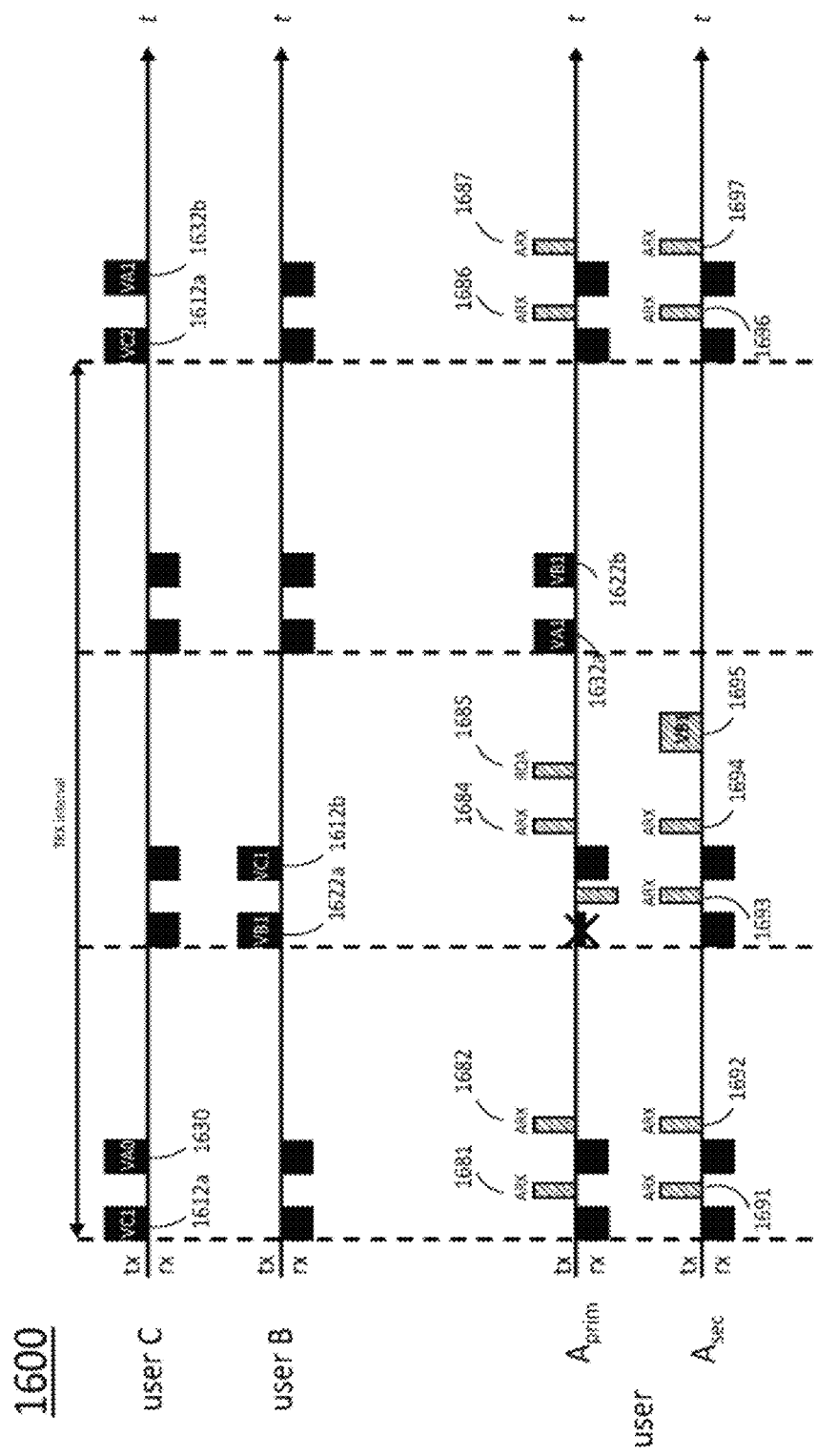
FIG. 16 is a data flow and timing diagram of a communication protocol where receive diversity is applied between a left and right earpiece of a headset.

In the above description, the protocol for SRRD group communications has been assuming a single radio transceiver 250 per headset 12. Both mono headsets and stereo headsets can be supported by this protocol. For stereo headsets, the audio signals received in one earpiece including the radio transceiver 250 are communicated to the other earpiece via a wire. Recently, headsets 12 have entered the market that comprise of two separate, left and right, earpieces, so called True Wireless (TW) headsets. Communication between left and right earpieces occurs wirelessly, either via magnetic coupling (NFMI) or via an RF communication over the ear-to-ear (e2e) link 17. In the latter case, the radio transceiver 250 serves both the group connection to the other group members (i.e. broadcast transmission and reception) and the connection to the other earpiece of the user. For the broadcast communication protocol (including the control), still a single transceiver 250 per headset 12 is experienced. In a TW system, this is called the primary earpiece. The primary earpiece is engaged in the group communications with other (primary) earpieces of the other participants. The primary earpiece may forward audio data to the secondary earpiece. For increasing robustness, the secondary earpiece may also eavesdrop on the broadcast transmissions. This will provide diversity during reception since both the primary and the secondary earpieces are able to receive the broadcast messages and may forward audio packets via the wireless e2e link 17 to the other earpiece where initial reception had failed. A suitable receive diversity protocol has been described in PCT Application PCT/EP2018/086768, filed Dec. 21, 2018, and U.S. patent application Ser. No. 16/957,225, filed Jun. 23, 2020. Features of this diversity protocol can also be applied for TW headsets involved in group communications. An example of this diversity mechanism is illustrated in FIG. 16. An SRRD broadcasting group of three users A, B, and C is shown that sequentially transmit broadcast messages, possibly with retransmissions. For user A, both primary earpiece 12*p* and secondary earpiece 12*s* are shown. Broadcast messages (and corresponding receive windows) are indicated by solid boxes. Primary earpiece Aprim 12*p* and secondary earpiece Asec 12*s* communicate via the e2e link 17. Communication messages over this e2e link 17 are indicated by dashed boxes. After the primary earpiece Aprim 12*p* has received broadcast message 1612*a* from user C, it will send an Audio Received (ARX) message 1681 to the secondary earpiece Asec 12*b*. This ARX message indicates that primary earpiece Aprim 12*p* has received the packet 1612*a* from user C. The ARX message 1681 may indicate a reference to audio data VC1 which may be included in broadcast message 1612*a*, or it may refer to the point in time when packet 1612*a* was received. Since secondary earpiece Asec 12*s* has also successfully received message 1612*a*, it may also send an ARX message 1691 over e2e link 17 to indicate to the primary earpiece Aprim 12*p* that it has received the audio data VC1 successfully. The ARX messages 1681 and 1691 can be staggered in time, or they may be sent substantially simultaneously as shown in FIG. 16. Since both earpieces 12*p* and 12*s* have received the audio data VC1 successfully, the ARX information is superfluous. ARX messages 1682 and 1692 indicate the successful reception of broadcast message 1630 including audio data VA0. Yet, in the next broadcast transmission of packet 1622*a*, the reception in the primary earpiece Aprim 12*p* fails (indicated by a cross through the receive window). As a result, Aprim 12*p* will not send an ARX packet, but instead will listen on the e2e link 17 for messages from Asec 12*s*. In Asec 12*s*, packet 1622*a* is received successfully. As a result, Asec 12*s* will send an ARX message 1693, which is received by Aprim 12*p*. This indicates to Aprim 12*p* that Asec 12*s* has received the packet 1622*a* comprising audio data VB1 successfully. Next, broadcast packet 1612*b* is received successfully in both earpieces 12*p* and 12*s*, and corresponding ARX messages 1684, 1694 are sent. Thereafter, the primary earpiece Aprim 12*p* can request for the missing audio data VB1 by sending an audio request message RQA 1685 to the secondary earpiece Asec 12*s* over e2e link 17. This triggers Asec 12*s* to forward the missing audio data VB1 in e2e data packet 1695. Since earpiece Aprim 12*p* has received the audio data VB1 before it needs to broadcast next, it will be able to support the retransmission of VB1 as shown in packet 1622b. It will be understood that a similar diversity procedure can be carried out when the secondary earpiece Asec 12s misses one or more packets. It can then send an audio request message RQA to the primary earpiece Aprim 12p to request forwarding the missing audio data over e2e link 17.

Figure 17:
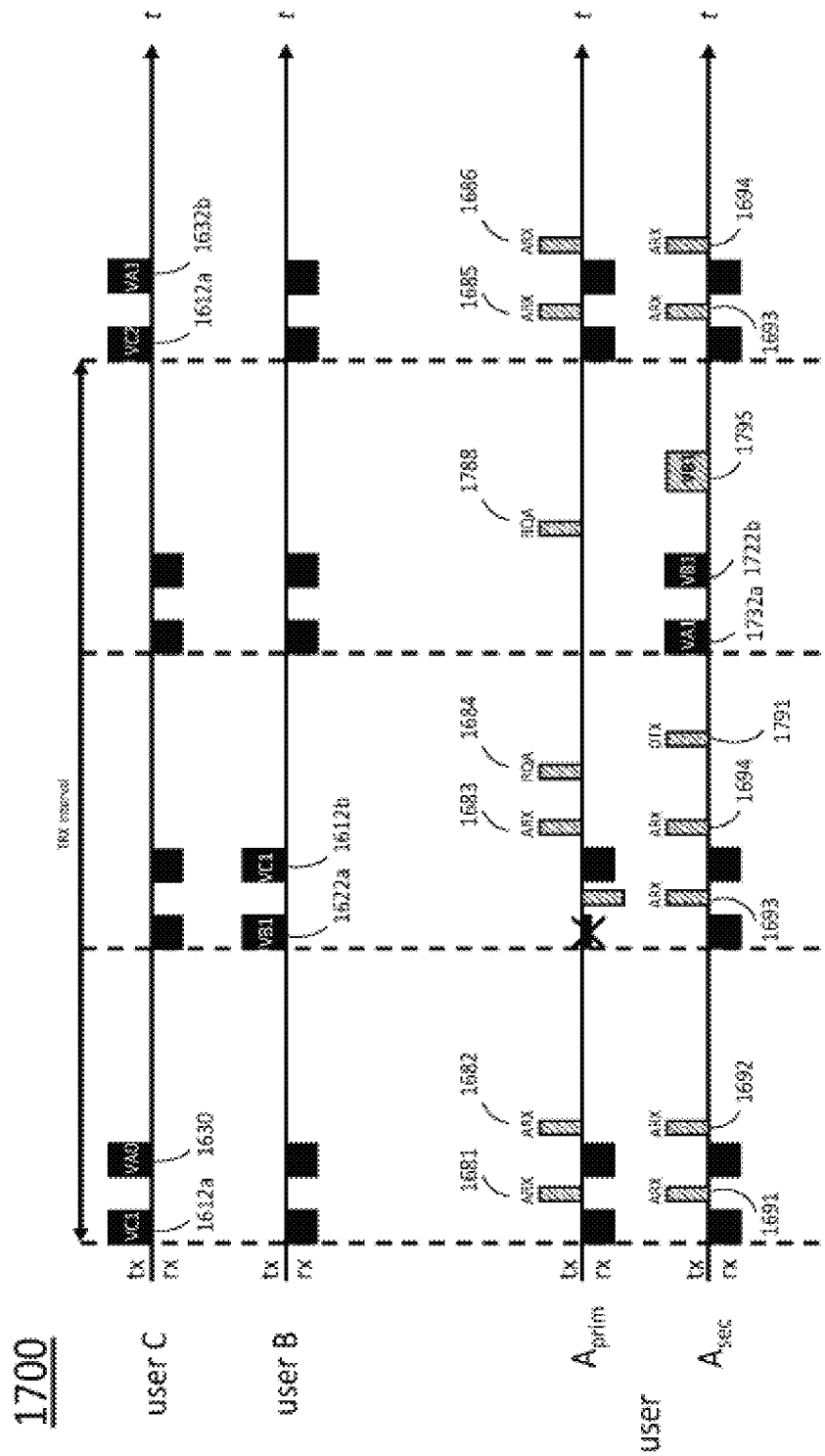
FIG. 17 is a data flow and timing diagram of a communication protocol where receive and transmit diversity are applied between a left and right earpiece of a headset.

The diversity mechanism previously described is based on receive diversity. A (broadcast) packet is received by multiple receivers that inter-communicate and can forward received packets to each other via a different path. For the application in group communications, a challenge may form the retransmissions. In FIG. 16, Aprim 12p could retransmit VB1 in packet 1622b, because it was forwarded in time by Asec 12s in e2e data packet 1695. However, if 1695 would be missed, or there would not be capacity on the e2e link to get data packet 1695 in time for retransmission 1622b (note, VB1 could always be requested by Aprim 12p at a later stage to be inserted in the audio stream of Aprim at the expense of latency), the failure to receive audio content VB1 in broadcast packet 1622a would also prevent Aprim 12p to retransmit VB1 in packet 1622b. To solve this challenge, in addition to receive diversity, also transmit diversity can be applied. A full diversity concept for TW headsets has been presented in PCT Application PCT/EP2019/067219, filed Jun. 27, 2019, and U.S. patent application Ser. No. 16/957,777, filed Jun. 25, 2020. A similar procedure can be used in case of group communications. Transmit diversity will solve the problem of failing retransmissions because of failed reception. An example of a combined receive and transmit diversity is shown in FIG. 17. Again, the reception of broadcast packet 1622a fails in the receiver of Aprim 12p. As before, Aprim 12p requests a forwarding of audio content VB1 in audio request message RQA 1684. Suppose, there is not enough time to forward audio content VB1 in time over the e2e link 17. Instead of sending VB1 (or in addition to sending VB1), Asec 12s sends an Diversity Transmit (DTX) message 1791. This indicates that Asec 12s will take care of the retransmission of audio content VB1. This is done in retransmission packet 1722b. Preferably, Asec 12s also takes care of the broadcast transmission VA1 in packet 1732a (although this could be handled by Aprim 12p in packet 1632a as was done in FIG. 16). Thereafter, Aprim 12p has ample of time to get audio content VB1 by repeatedly sending an RQA packet 1788. In this example, VB1 is forwarded by Asec 12s in e2e data packet 1795.

Figure 18:
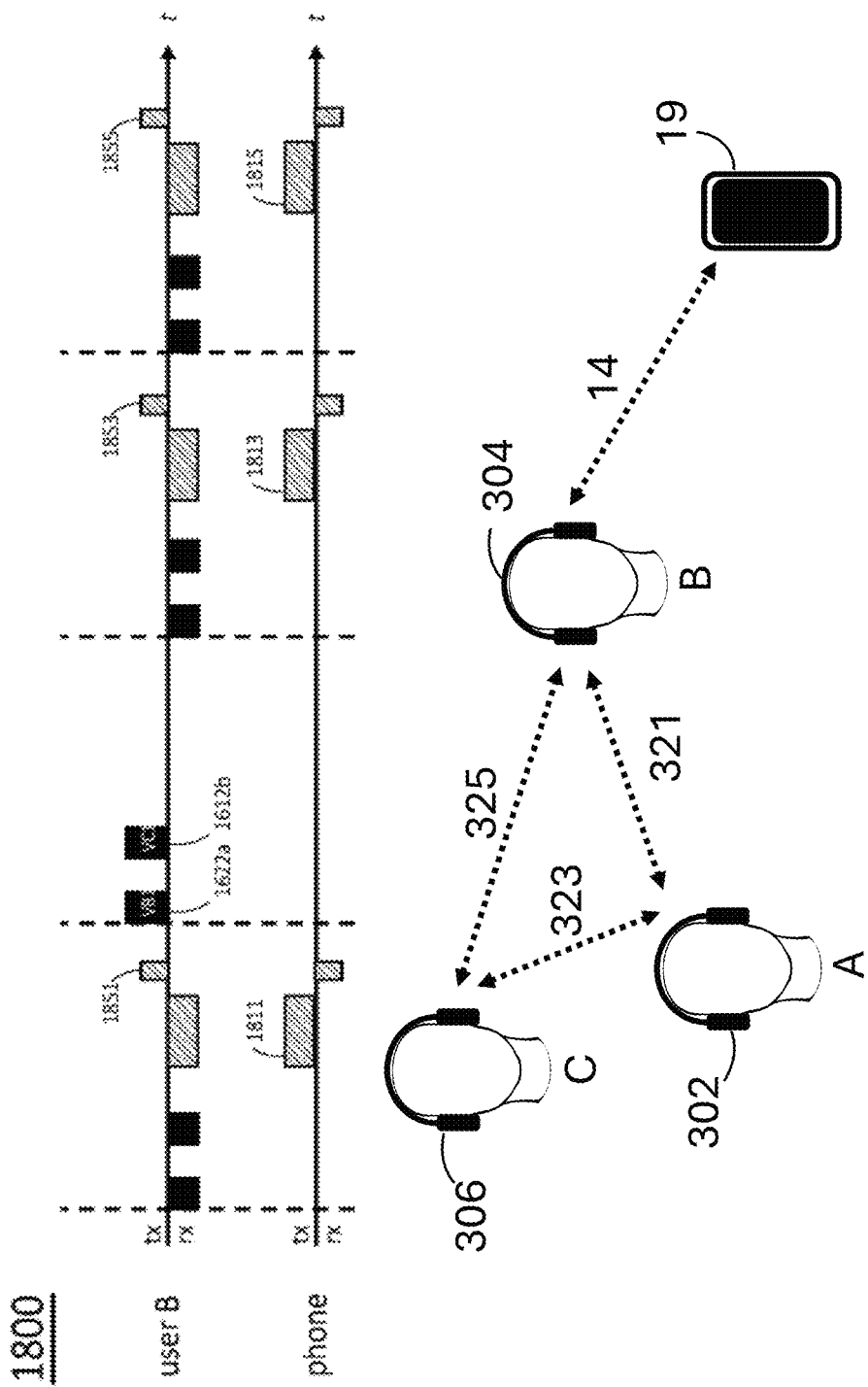
FIG. 18 is a data flow and timing diagram of a communication protocol where a headset concurrently participates on a group communication channel and listen to music from the phone.

Capacity on the links can be limited because, in addition to the group channel (and e2e link) communications, the radio transceiver 250 can be engaged in (several) other services. For example, during time windows where no group communications take place, the radio transceiver 250 may communicate with mobile phone 19 using link 14, see FIG. 18; for instance to listen to music. The transceiver will time multiplex between different channels—for the user, it seems that (multiple) concurrent services are supported. In the timing diagram of FIG. 18 the broadcast packets for group communications are shown by solid boxes, the packets exchanged on the phone link 14 are shown by dashed boxes. Music packets 1811, 1813, 1815 are, for example, sent asynchronously over a Bluetooth A2DP (Advanced Audio distribution Profile) connection by the phone 19; ACK packets 1851, 1853, 1855 are returned by user B's headset 304. Link 14 may use a standard Bluetooth ACL connection or may be based on LE Audio for sending music packets. Alternatively, music packets are broadcast by one of the group participants, allowing all users to listen to the same music. For example, the Central headset has a standard (Bluetooth) music link to its mobile phone 19, receiving A2DP music packets. After reception, the Central headset broadcasts the music audio data to the other group participants. In the headsets 12 of each participant, the music is mixed with the voice signals of the group communications.

Figure 19:
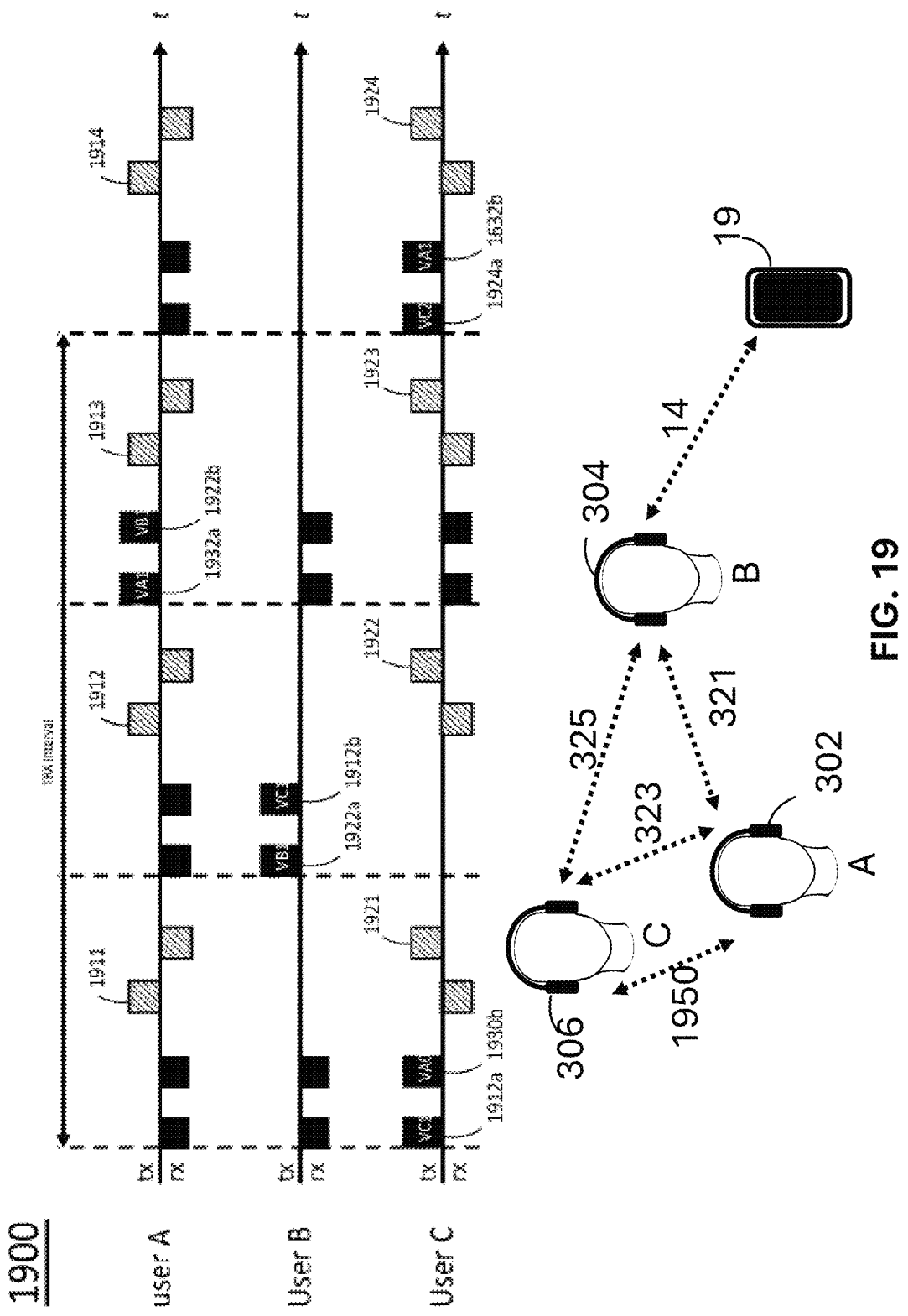
FIG. 19 is a data flow and timing diagram of a communication protocol where a headset concurrently participates on a group communication channel and supports a private bi-directional connection to another headset.

Another concurrent service might be a bi-directional private link between two users in the SRRD broadcasting group. A timing example is shown in FIG. 19. In addition to the group communications between A 302, B 304, and C 306, users A 302 and C 306 have a private communication (the messages of which are shown by dashed boxes in the timing diagram) using link 1950. In between the broadcast messages (solid boxes), private voice packets 1911, 1921 are exchanged between users A and C. These packets may be part of a standard Bluetooth eSCO connection or are based on LE Audio for sending voice packets. These private voice packets may also be retransmitted (not shown), but only on link 1950. They could be retransmitted by group members other than A and C, but they would then not be decoded and decrypted by the unit that is forwarding the messages. To switch between the group communication and private communication, the user (A 302 or C 306) may have to apply a switch action explicitly e.g. on their headset. This can be manually: push to talk, orally via speech control, or some other means. In private mode, the voice signals picked up by the MIC 220 will only be sent over the private link 1950. In group mode, the voice signals picked up by the MIC 220 will be broadcast to all participants. In the receiver, the private voice messages may be mixed with the broadcast messages such that a user (A 302 or C 306) can still listen to group communications while communicating privately. A buffer arrangement similar as shown in FIG. 14 can be used to this purpose.

Figure 20:
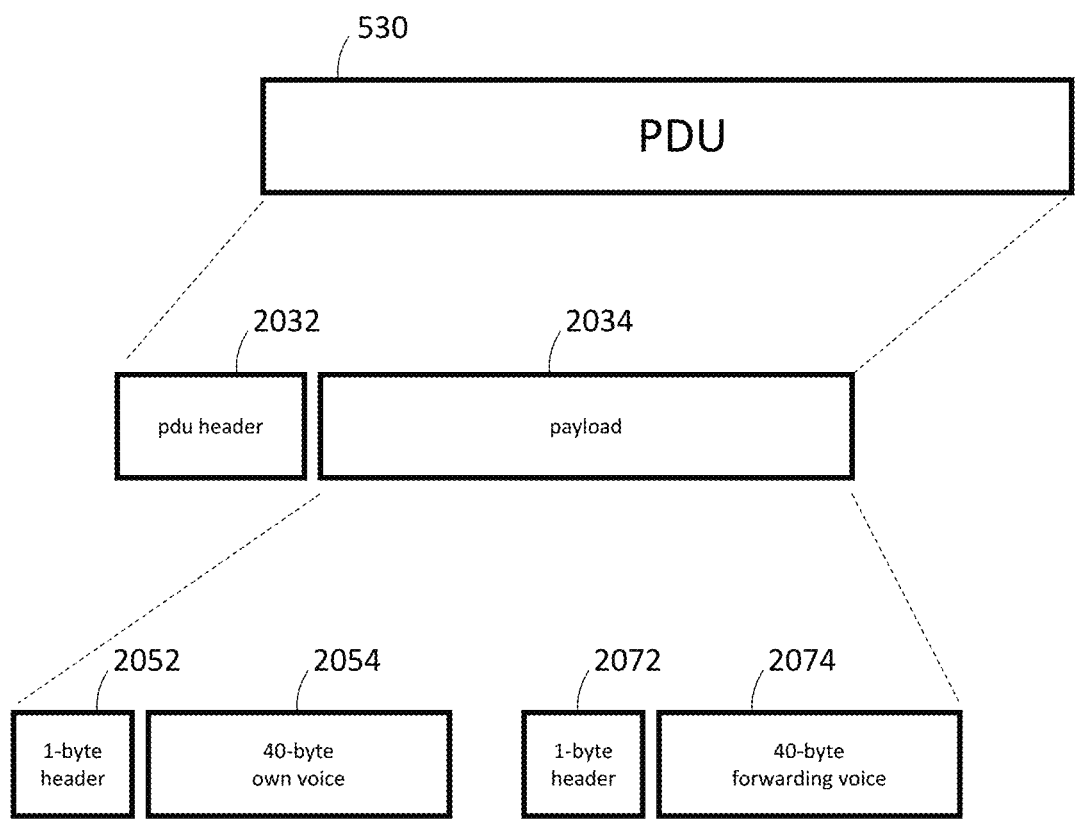
FIG. 20 is an example of a packet arrangement as used by the Bluetooth® Low Energy wireless standard.
Figure 21:
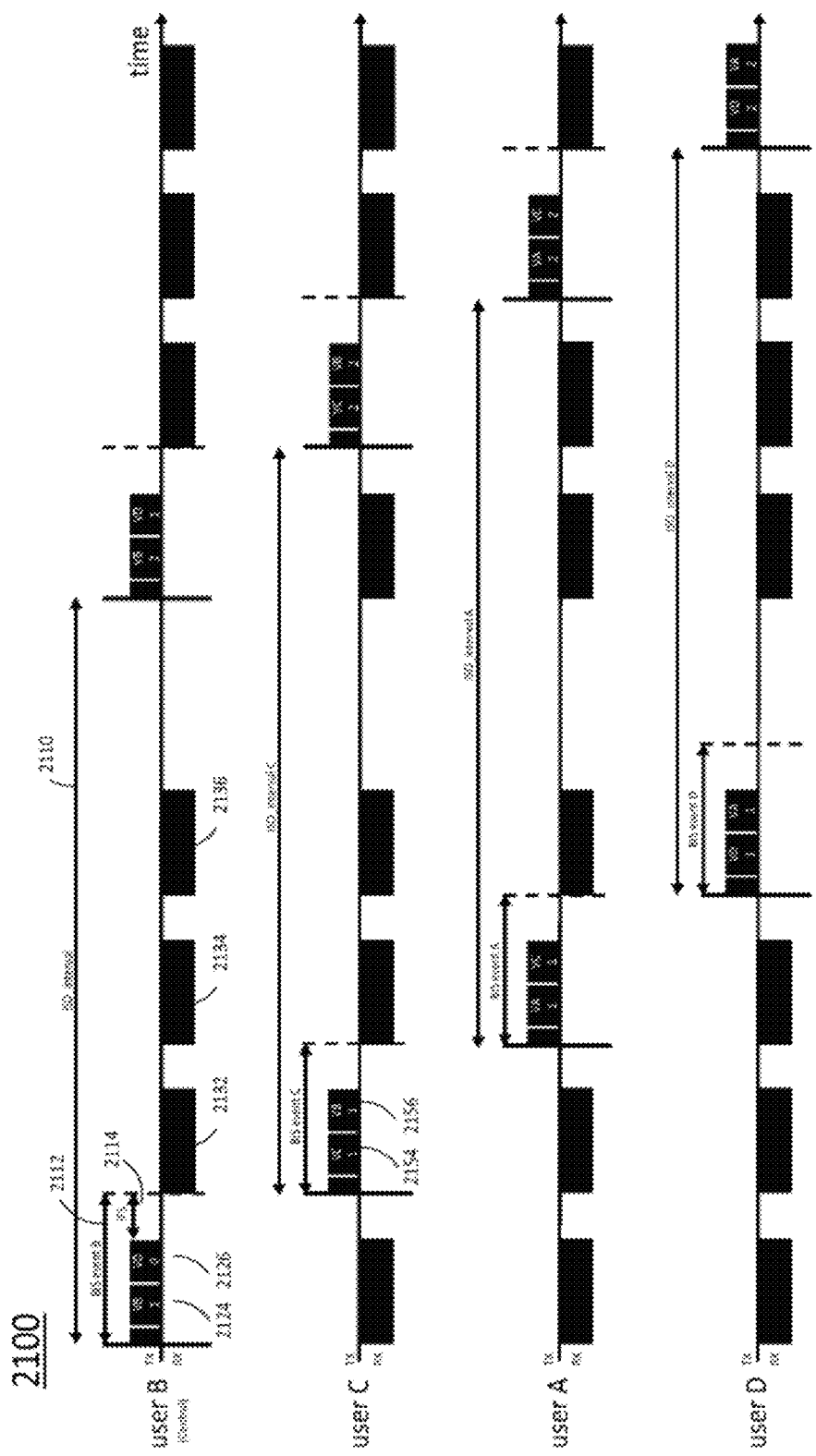
FIG. 21 is a data flow and timing diagram using Bluetooth® Low Energy radio packets according to a third embodiment.

In a third embodiment, the PDU 530 as shown in the packet FIG. 5 includes a PDU header 2032 and a payload 2034, for example using a format as defined by the Bluetooth Low Energy (LE) standard, see FIG. 20. For the group communications protocol, the payload may comprise multiple audio segments, including the own voice segment 2054 and the voice segment 2074 of another user that needs to be forwarded. Each audio segment may be preceded by a header (2052, 2072), for example including a voice stream identifier and/or a length indicator. Packets comprising multiple audio segments may use the isochronous timing of Bluetooth LE, with the ISO interval 2110 used for TRX interval 604, and using staggered Broadcast Isochronous Stream (BIS) channels as is shown in FIG. 21. During a BIS event 2112 a single packet is broadcast. In the example shown in FIG. 21, user B is the Central device. It sends its own voice VB in first payload segment 2124 and retransmits the voice VD received from user D in the second payload segment 2126. A switching time IFS (Inter Frame Spacing) is added for the radio transceiver to change carrier frequency. The next user in the ordered timing scheme, user C in FIG. 21, has the next opportunity to broadcast its own voice VC in first payload segment 2154 and retransmits the voice received from the previous broadcast transmission (audio VB from user B) in the second payload segment 2156, and so on.

Figure 22:
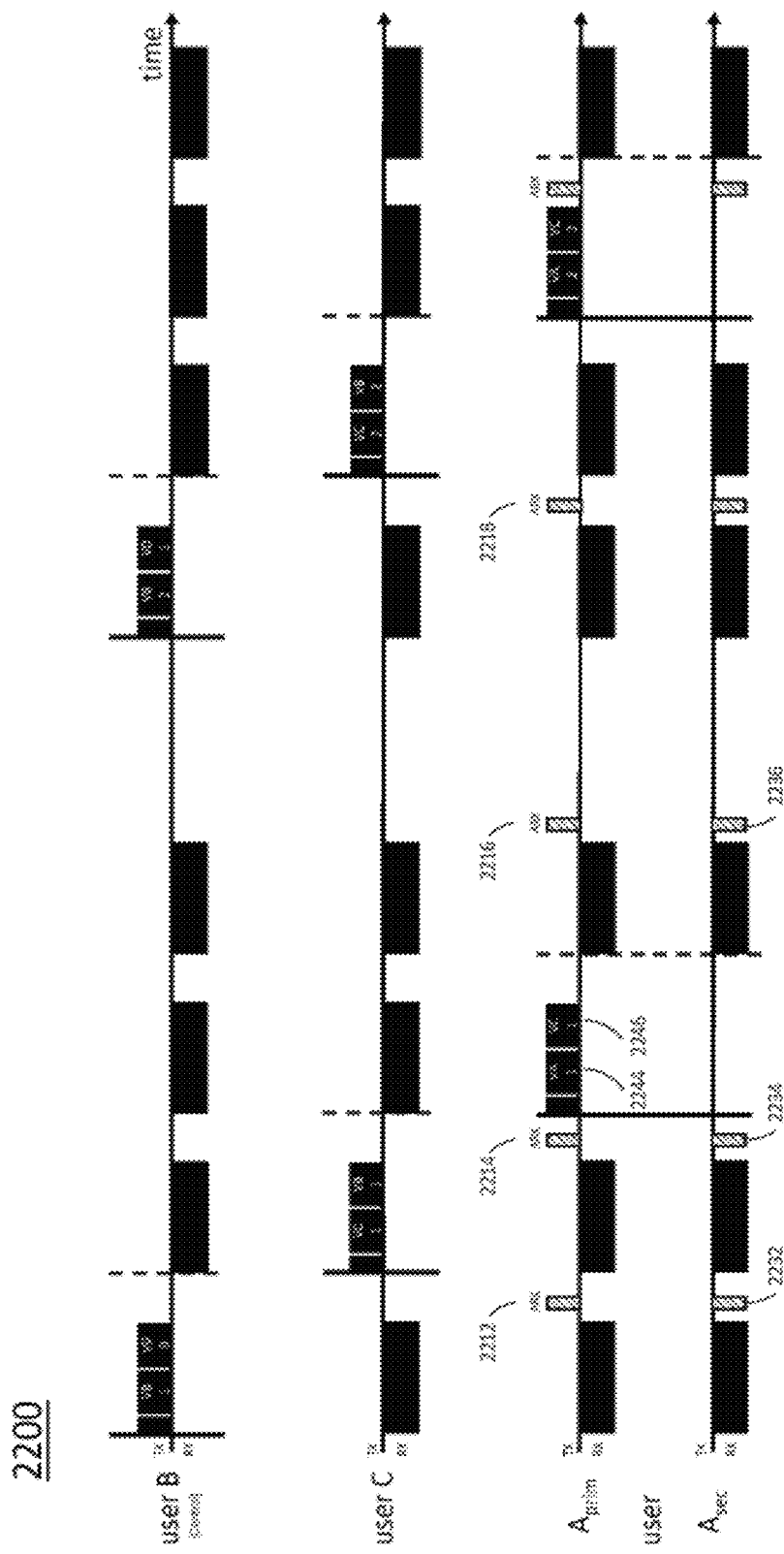
FIG. 22 is a data flow and timing diagram of a communication protocol where receive and transmit diversity are applied between a left and right earpiece of a headset according to a third embodiment when no errors are present.
Figure 23:
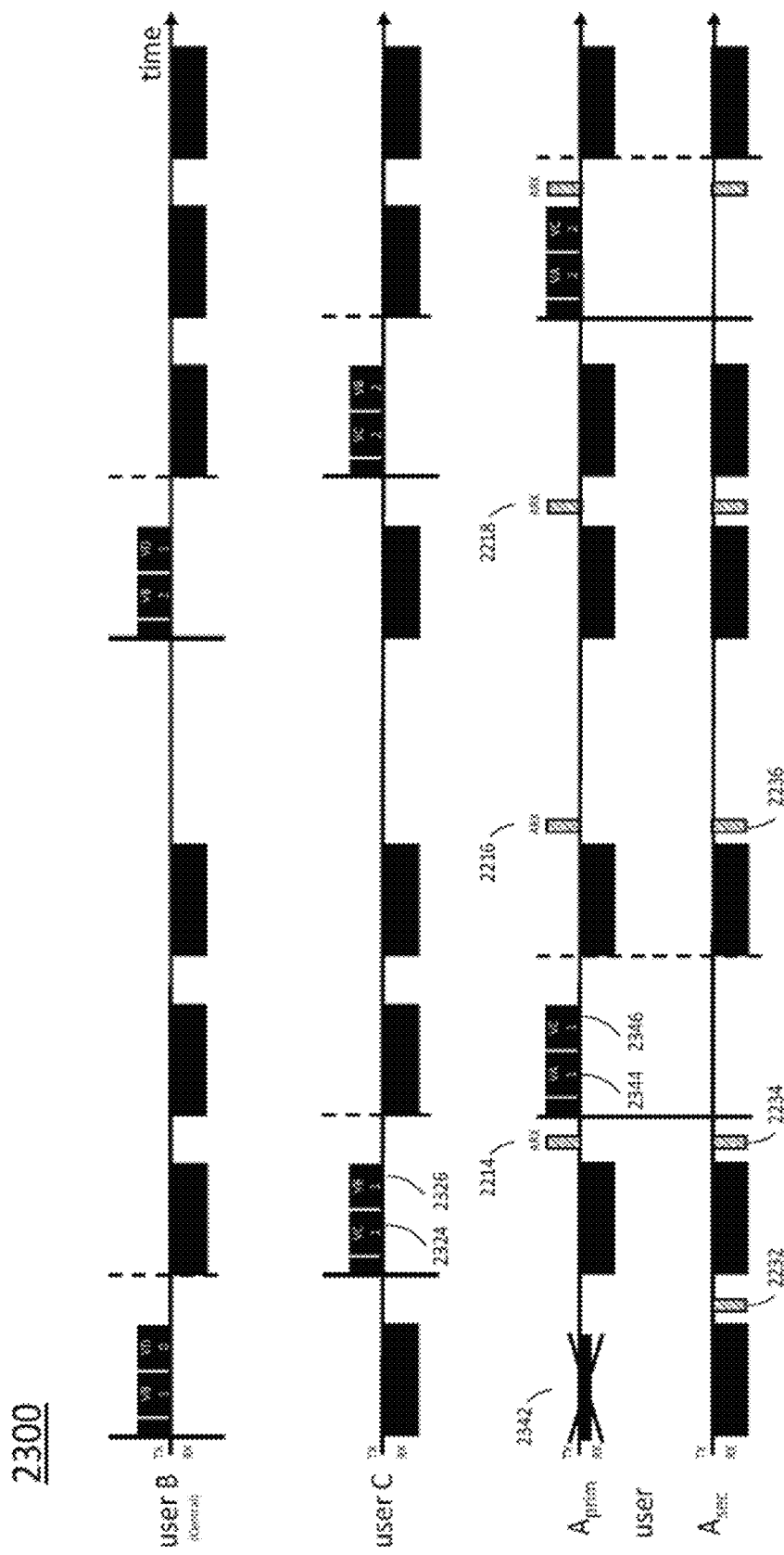
FIG. 23 is a data flow and timing diagram of a communication protocol where receive and transmit diversity are applied between a left and right earpiece of a headset according to a third embodiment when a single error is present in the primary earpiece.
Figure 24:
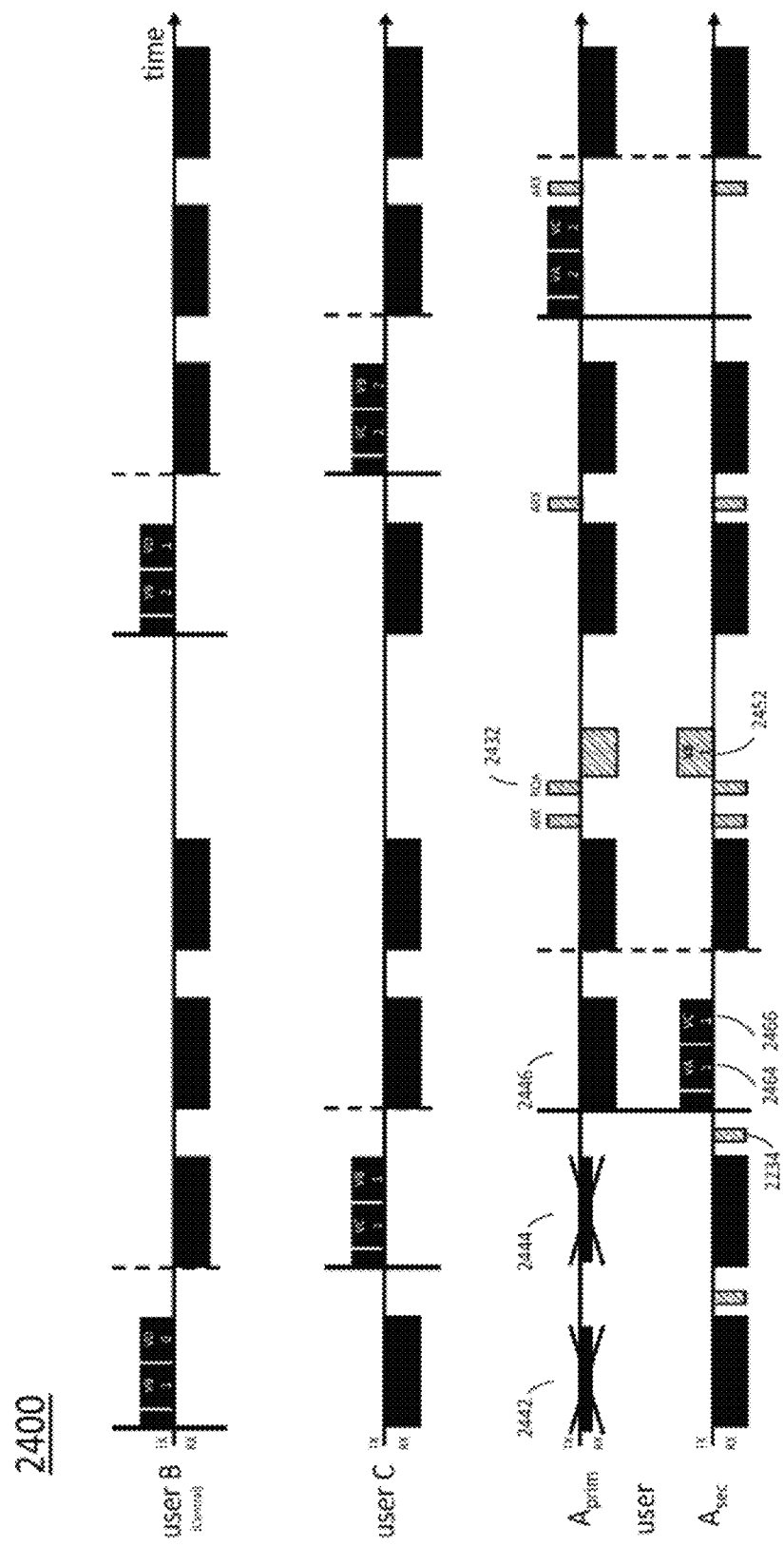
FIG. 24 is a data flow and timing diagram of a communication protocol where receive and transmit diversity are applied between a left and right earpiece of a headset according to a third embodiment when a double error is present in the primary earpiece.

If user A has a True Wireless headset, it can use the left and right radios in the headset for providing diversity. As is shown in FIG. 22, the Primary earpiece Aprim 12p will send an Audio Received (ARX) message (2212, 2214, 2216, 2218) to the Secondary earpiece Asec 12s over the e2e link 17 each time Aprim has received a broadcast transmission successfully. Communication messages over this e2e link 17 are indicated by dashed boxes in FIG. 22. For simplicity, in FIG. 22, the broadcast transmissions of user D are not shown. If there are no errors, the Primary earpiece Aprim 12p will take care of the broadcast transmission of user A including its own voice VA (payload segment 2244) and the voice VC to be forwarded (payload segment 2246). Since the Secondary earpiece Asec 12s has received the ARX message 2214 just prior to user A's broadcast opportunity, it will abstain from transmitting. In FIG. 23, Aprim 12p misses the broadcast transmission (including VB1 and VD0) from user B. It will not send an ARX message to Asec 12s. However, there is a retransmission of the voice VB1 of user B by user C in payload segment 2326, allowing Aprim 12p still to receive the voice of user B successfully. However, if there is a double error as is shown in FIG. 24, Aprim 12p will miss both the voice VB1 of user B and the voice VC1 of user C. Therefore, it cannot retransmit VC1 in voice segment 2246 as previously done (see FIG. 22, payload segment 2346). The absence of the ARX message (2214 in FIG. 23) just prior to transmission during receive window 2234 will indicate to Asec 12s that Aprim 12p will abstain from broadcasting. Instead, Asec 12s will take care of the broadcast transmission and send VA1 in payload segment 2464 and VC1 in payload segment 2466. While listening to the transmission in receive window 2446, Aprim 12p will receive the missed voice part VC1 and does not need to request this part over the e2e link 17. However, since Aprim 12p still misses VB1 (missed in receive windows 2442 and 2444) it will need to explicitly asked for this VB1 segment to Asec 12s over the e2e link. Aprim 12p will send a Request Audio (RQA) message 2432 when air time allows (after the reception of the broadcast of user D), and Asec 12s will forward the missing voice segment VB1 in e2e packet 2452. It will be understood that if only the packet received in receive window 2444 would have been unsuccessful in Aprim 12p missing VC1, Asec 12s would still take over the broadcast transmission with including payload segments 2464 and 2466, implicitly forwarding VC1 to Aprim 12p by the broadcast. However, since VB1 would have been received by Aprim 12p in receive window 2442, there would not be a need for a forwarding action over the e2e link 17 with RQA message 2432 and e2e packet 2452. It will be understood by those of skill in the art that double errors in the Secondary earpiece Asec 12s will lead to a forwarding action over the e2e link 17 from Aprim 12p to Asec 12s. It will also be understood that if Asec 12s listens to the broadcast transmission of Aprim 12p, it may abstain from requesting forwarding over the e2e link of packets missed from user C.

The timing scheme with the sequential broadcast transmissions can be set once during the setup of the group chat channel. However, the timing scheme may also change dynamically during the group communication session. Preferably the TRX interval 604 is kept to minimum to reduce the overall delay (latency) in the system. The length of the TRX interval 604 may need to be increased when additional group members may want to join the SRRD broadcasting group. Or the length can be reduced when one or more members leave the SRRD broadcasting group. The timing scheme may also depend on the instantaneous activity of the each participant. Voice-activity-detection (VAD) may be applied to detect if a user is actually talking. Instead of a fixed broadcast time slot reservation for each participant, only a few participants that are talking (or have recently been talking), are allocated a broadcast transmission opportunity on the group channel. Suppose in scenario 900 depicted in FIG. 9 an additional participant E (not shown) joins the SRRD broadcasting group and the Central device wants to keep the number of broadcast transmissions per TRX interval limited to four. Based on current and past activity of the participants, the Central device may reallocate the timing scheme and exchange users. For example, suppose user D has been silent for a while, the Central device may reallocate the timing of user D (packets 842a and 832b) to user E when user E starts to talk. Note that packets 842a and 832b will then both be broadcasted by user E. Packet 832b will still include the voice segment VA1 of user A (retransmission), but packet 842a will now include the voice of user E (VE1, not shown in FIG. 9). Communications of VAD status between a participant and the Central device as well as the control messaging for rearranging the timing scheme may be done over a bi-directional wireless control connection the Central device maintains to each participant. With using VAD, the TRX interval 604 can be kept short with a group channel having only a few broadcast transmission instances while a larger number of participants is present in the group. If propagation conditions are bad, extra retransmissions (forwarding opportunities) may be needed, requiring additional time thus requiring the TRX interval 604 to be extended. If range problems are encountered, a more robust modulation scheme may be used, for example Bluetooth LE Long Range, and/or Forward-Error-Correction (FEC) coding may be applied, both of which will increase the length of the broadcast packets. If propagation conditions are good, a higher-order modulation scheme or a modulation scheme with shorter symbols lengths may be used, for example the Bluetooth Classic Enhanced-Data-Rate (EDR) mode 2 or 3 Mb/s mode or the Bluetooth LE 2 Mb/s mode. This will result in shorter packets allowing the TRX interval 604 to be shortened.

Delay over the group channel may lead to echoes. This may happen when sound arrives at the ear along different paths with different delays. For example, an earpiece of a headphone may pick up environmental sounds to be produced at the users ear (also called transparency). The voice of one user may arrive at the ear of another user both via a natural path with sound waves and via the electronic path through the wireless group channel. Echo suppression techniques may be used to suppress the impact of the effect of sounds arriving at different delays. Noise suppression and/or cancellation techniques may be included to remove unwanted sounds in the headset.

Figure 25:
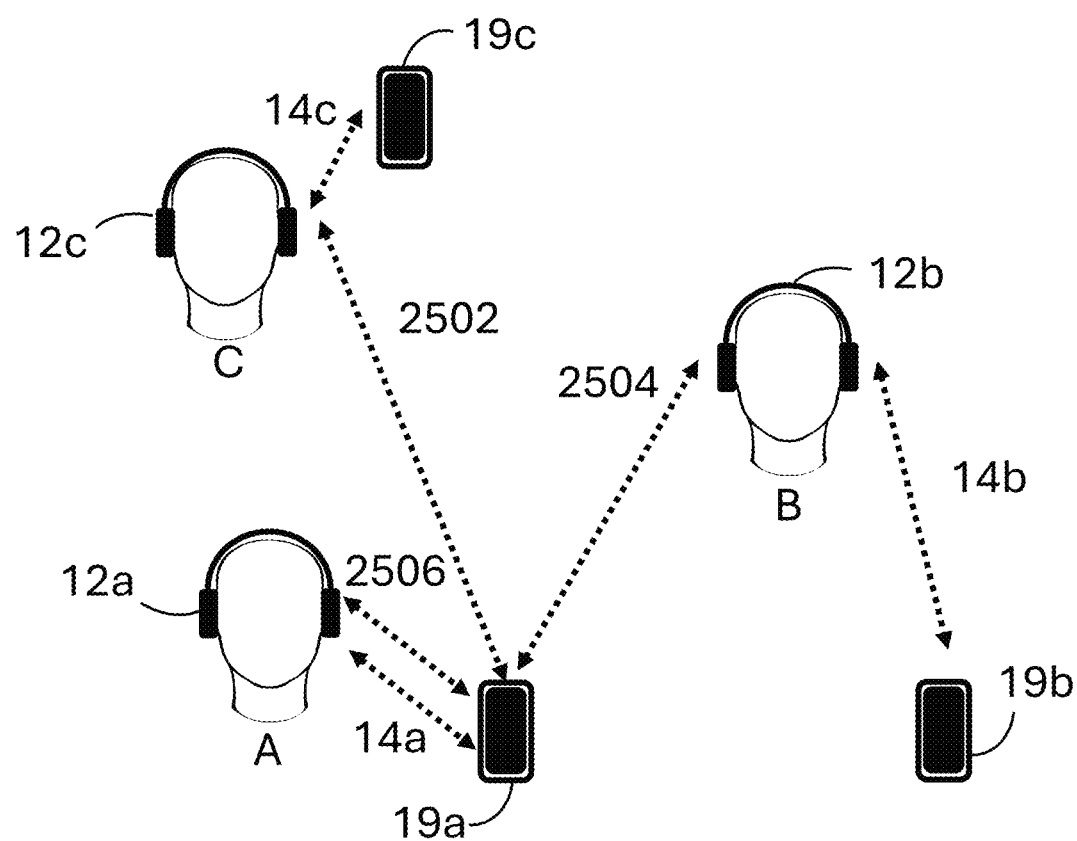
FIG. 25 is an example where a smartphone controls the establishment of the group communication channel.

To create an SRRD broadcasting group, preferably a group app on a smartphone 19 is running in a scenario as is shown in FIG. 25. Using a standard wireless protocol, e.g. Bluetooth LE, the smartphone 19 connects to each headset 12 (i.e. to the Primary earpiece 12s in case of a TW headset) separately (connections 2502, 2504, 2506) to convey information about the group channel to be established. For example, frequency hopping and timing information defining the group channel (i.e. the broadcast channels) may be communicated from user A's smartphone 19a to each headset 12a, 12b, and 12c. After this initialization setup, the headsets 12a, 12b, 12c will be active on the group channel, and a headset 12 will be selected that will act as Central device. For example, headset 12a connected to smartphone 19a may be selected as Central device on the broadcast channel. From that moment on, control can be taken by the Central headset 12a, which maintains a (low duty cycle) control connection (e.g. based on Bluetooth LE) to each Peripheral headset (12b, 12c). Control messages can for example comprise detailed information about the set of hop carriers which may be adaptive to avoid RF interference. When a participant leaves the SRRD broadcasting group or a new participant enters the SRRD broadcasting group, the Central headset 12a may communicate new timing, hopping, and/or retransmission information to each of the participants in the SRRD broadcasting group.

After the headset 12a takes over as Central device, the connections (2502, 2504, and 2506) between the smartphone 19a and the headsets 12a, 12b, 12c could be released. Preferably, the connections between the headset(s) 12a, 12b, 12c and the smartphone 19a are maintained in the background for control messaging. Each headset 12 may also maintain a control connection (preferably based on Bluetooth LE) to its own smartphone 19 via link 14. On each of these smartphones 19, the group app may run in the background. This group app may provide supporting functions to the group communications, sending control messages in the group via the associated headset 12.

Preferably, communications between the headsets in the SRRD broadcasting group is secure. Standard authentication techniques can be used so only authorized headsets 12 are allowed in the group. Authentication may take place via the mobile phone app that creates the SRRD broadcasting group at the start. To allow a new headset 12 in the group, the user may need to go through an authentication procedure. This can be as simple as a push on a button on the headset 12 at the right moment in time, it may be based on some biomedical authentication technique (e.g. fingerprint, or identification of the ear), or it may be based on a method via an alternative communication channel, i.e. Near Field Communications (NFC). After the authentication, a participant is admitted to the channel. All broadcast messages shall be encrypted. A common group session key may be applied to encrypt and decrypt the messages. This group session key may be communicated over a secure link to the headset 12 of each participant, preferably by the mobile phone 19 that establishes the common group channel. Standard encryption techniques may be used, including the use of varying nonces. For the private link 1950 as discussed in FIG. 19 preferably separate encryption keys and nonces are used, only known to the users involved in the private communications (users A 302 and C 306 in FIG. 19).

Figure 26:
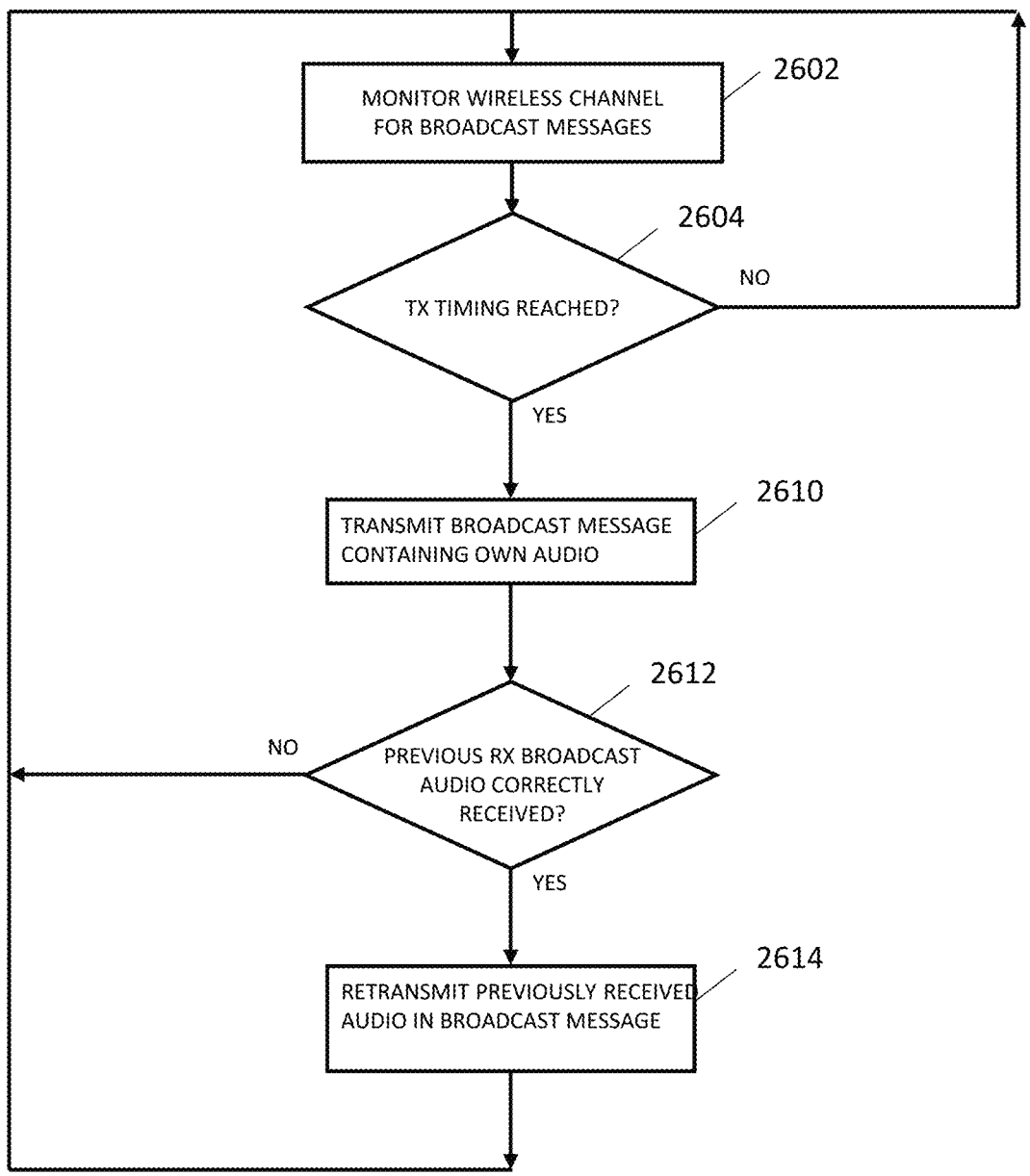
FIG. 26 is flow diagram of a communication protocol where a headset alternatively listens for broadcast messages, transmits broadcast messages comprising audio sampled by its own microphone, and retransmits broadcast audio previously received from other headsets.

FIG. 26 is a flow diagram of a method 2600 of receiving, transmitting, and retransmitting audio content by a headset on a wireless channel shared by two or more participants according to the current invention. FIG. 26 depicts the steps performed in each headset. The headset listens for broadcast messages (block 2602). If the transmit timing of the headset has arrived (block 2604), the headset will stop listening and switch to transmit mode to send a broadcast message comprising audio sampled by the microphone in the headset (block 2610). If one or more previously sent broadcast messages have been received correctly (block 2612), the headset may retransmit the audio data in these broadcast message(s) as well (block 2614). In case, own audio and previously (to be retransmitted) audio are placed in the same payload, the actions of block 2610 are integrated into the actions of block 2614.

Embodiments of the present invention present numerous advantages over the prior art. By using broadcast transmission by each participant in an SRRD broadcasting group, group communications becomes possible. Furthermore, by having a participant retransmit (forward) packet received from other participants, robustness and range are greatly improved. In particular when retransmission takes place at a different time and a different carrier frequency. Several protocols are disclosed, allowing for efficient retransmission schemes and audio processing.

In embodiments, one or more SRRDs in the group can control switching on one or more of the SRRDs in the group.

In embodiments, the SRRD or each SRRD in the group has a control button. The button can e.g. have a 'raise hand' function. The master SRRD can, in case of 'raise hand' allow that SRRD to broadcast its audio content according to the method.

In the disclosed embodiments, live audio content is exchanged and shared in the SRRD group. However also other data can be shared with limited latency. In embodiments, video streams can be shared. Accordingly a method is provided for exchanging data such as video between two or more recording and/or reproduction devices (RRDs), the method comprising: configuring a RRD broadcasting group of two, three or more RRDs and configuring time periods for that RRD broadcasting group; wherein the method comprises repeatedly: receiving data; broadcasting one or more radio packets comprising the received data; receiving from one, two or more other RRDs in the RRD broadcasting group, one or more radio packets that were broadcasted by and that comprise the data from the respective one, two or more other RRDs in the broadcasting group; and processing the received radio packets to reproduce the data from the one, two or more other RRDs. Video content and/or audio content may also be combined with Augmented Reality (AR) content. AR content generated in one RDD may be broadcast to other RRDs in the RRD broadcasting group. Multiple AR content received from different group members maybe be combined and presented as a combined image to the receiver.

The following clauses detail a number of aspects and/or features of the present invention.

Clauses:

Clause 1. A method of exchanging audio content between two, three or more sound recording and/or reproduction devices (SRRDs), such as headsets, the method comprising:
configuring a SRRD broadcasting group of two, three or more SRRDs and configuring time periods for that SRRD broadcasting group;
wherein the method comprises repeatedly:
providing, at at least one broadcasting SRRD within the SRRD broadcasting group, audio data with audio content;
broadcasting, by the at least one broadcasting SRRD, one or more radio packets comprising the provided audio data;
receiving, at at least one reproducing SRRD in the SRRD broadcasting group, the broadcasted one or more radio packets; and
audio processing the received radio packets to reproduce audio content from the at least one broadcasting SRRD at the at least one reproducing SRRD.

Clause 2. A method according to clause 1, wherein the method further comprises providing one or more SRRDs, each SRRD having:
a processor,
a transceiver, and
a loudspeaker and/or a microphone,
wherein in the method the processor:
configures, preferably forms and/or joins, the SRRD broadcasting group via the transceiver;
in case the microphone is provided, is provided with the audio data picked up by the microphone of the SRRD;
broadcasts and/or receives radio packets with audio data via the transceiver; and
in case a loudspeaker is provided, processes the received audio data from the one, two or more broadcasting SRRDs in the SRRD broadcasting group and feeds the loudspeaker for reproduction of the audio content.

Clause 3. A method according to clause 1 or 2, wherein, in a configured time period, two or more broadcasting SRRDs in the SRRD broadcasting group broadcast radio packets with provided respective audio data, preferably sequentially or consecutively and/or interleaved, wherein
- the method comprises repeating, in subsequent configured time periods, the broadcasting by two or more broadcasting SRRDs of radio packets having provided respective audio data; and/or
- the method further comprises, at two or more reproducing SRRDs, audio processing the received audio data, wherein preferably the audio processing at one reproducing SRRD is time staggered with respect to audio processing of another reproducing SRRD; and/or
- the method further comprises audio processing the received radio packets from two or more broadcasting SRRDs to reproduce a combined audio content at the reproducing SRRD of audio content provided by the two or more broadcasting SRRDs;
- wherein two or more broadcasting SRRDs broadcast sequentially and wherein one or more reproducing SRRDs sequentially receives one or more broadcasted radio packets, and/or
- configuring, preferably forming and/or joining, the SRRD broadcasting group comprises configuring a sequential broadcasting order for broadcasting SRRDs in the SRRD broadcasting group, wherein the sequential broadcasting order indicates the order in which (one or more) broadcasting SRRDs in the SRRD broadcasting group are to broadcast radio packets comprising the provided audio data; and/or
- the sequential broadcasting order is the order for broadcasting in one configured time period of consecutive configured time periods.

Clause 4. The method according to one of the previous clauses, wherein broadcasting by the broadcasting SRRD comprises broadcasting audio data received in radio packets from one or more other broadcasting SRRDs,
- wherein preferably broadcasting the one or more radio packets from the broadcasting SRRD and from the other broadcasting SRRD are broadcasted in a single payload.

Clause 5. A method according to any of the previous clauses, wherein the method comprises repetitively broadcasting in consecutive configured time periods by at least two, three or more broadcasting SRRDs, wherein
- audio content is captured at the broadcast SRRD in segments related, preferably corresponding, with the time period and broadcasted radio packet comprise audio data having a temporal length that is related, preferably corresponds, to the time period, wherein at the reproducing SRRD reproduction of the received audio data results in a continuous feed of audio content; and/or
- the broadcasting is sequentially, preferably interposed, in accordance with a sequential broadcast order, wherein preferably the sequential broadcasting of radio packets comprises rebroadcasting received radio packets from one, two or more broadcasting SRRDs in the SRRD broadcasting group, preferably the directly previously received radio packets; and/or
- audio processing at the reproducing SRRDs comprises combining the audio content from sequentially received radio packets for reproduction, wherein preferably said received audio content was picked up in a previous time period.

Clause 6. A method according to any of the previous clauses wherein configuring, preferably forming and/or joining, the SRRD broadcasting group comprises:
- configuring a channel and/or frequency for broadcasting, preferably frequency hopping sequence for broadcasting and receiving, preferably configuring frequency hop parameters and security parameters; and/or;
- configuring, preferably creating or obtaining, one or more broadcast channels, preferably one or more direct or unidirectional broadcast channels, more preferably one or more short-range broadcast channels, for broadcasting between two, three or more SRRDs in the SRRD broadcasting group,
  - wherein preferably the channel has a frame structure in the time domain,
  - preferably with a fixed interval corresponding to the configured time period; and/or
- configuring, preferably creating or obtaining, a broadcasting channel for the SRRD broadcasting group, and wherein the broadcast channel has a frame structure in the time domain, the frame having an interval time period that corresponds to the time periods; and/or
- configuring fixed consecutive interval time periods; and/or
- configuring a frame time period, preferably a fixed frame time period, for each SRRD; and/or
- configuring a fixed broadcasting time period for each SRRD; and/or
- creating pairs of SRRDs, wherein a first SRRD of the pair, after receiving radio packets from the second SRRD, rebroadcasts the received radio packets of the second SRRD; and/or
- time synchronizing the transceiver of a second SRRD to the reception and broadcasting of radio packets by the transceiver of a first SRRD.

Clauses 7. The method according to the previous clauses, wherein the method further comprises providing one or more SRRDs, each SRRD having a processor, a transceiver and a loudspeaker, and/or a microphone, wherein the SRRD is formed by two or more components, such as earpieces, wherein one component has:
- the processor, and
- the transceiver, and
- at least one of the loudspeaker or microphone,
- wherein the two or more components of the SRRD are receiving audio content, broadcasting radio packets, receiving radio packets, audio processing and reproducing the audio content received from two or more other SRRDs for a single user; and
- wherein preferably one component of the SRRD rebroadcasts received radio packets and another component of that SRRD receives the rebroadcasted received radio packets; and/or
- wherein receiving broadcasted radio packets at the first component of the SRRD, comprises, sending at least one Audio Received (ARX) message to the second component, the method further comprising the second component of the SRRD either (1) receiving the ARX message from the first component of the SRRD, or, (2) in case no ARX is received from the first component, sending the received broadcasted radio packet to the first component of the SRRD; and/or
- wherein two or more components that form the SRRD are allocated two or more time slots in the sequential broadcast order.

Clause 8. A computer-readable non-transitory storage medium or a computer program product, implemented on a computer-readable non-transitory storage medium, wherein the storage medium or the computer program product comprises
  computer executable instructions for exchanging audio content between two, three or more sound recording and/or reproduction devices (SRRD), which instructions, when executed by a processor, cause the processor to carry out the steps of:
  configuring, preferably forming and/or joining, a SRRD broadcasting group of two, three or more SRRDs and configuring, preferably receiving, time periods for that SRRD broadcasting group; and
  repeatedly:
    provide audio content, preferably by recording audio content;
    broadcasting one or more radio packets comprising the provided audio content;
    receiving broadcasted radio packets comprising audio content from one or more broadcasting SRRD; and
    audio processing the received radio packets to reproduce audio content of the one or more broadcasting SRRDs.

Clause 9. A device for exchanging audio content, the device comprising:
  a transceiver; and
  a processor, connected to the transceiver, arranged to:
    configure, preferably form and/or join, a SRRD broadcasting group of two, three or more sound recording and/or reproduction devices (SRRDs);
  wherein the processor is further configured to repeatedly:
  provide audio content, preferably by recording audio content;
  broadcast, via the transceiver, one or more radio packets (812a) that comprise the received audio content;
  receive, via the transceiver, one or more radio packets (822a, 832a, 842a) comprising audio content from one, two, or more broadcasting SRRDs in the SRRD broadcasting group; and
  audio process the received radio packets comprising audio content from one, two or more broadcasting SRRDs to reproduce the audio content.

Clause 10. Device according to clause 9, wherein the SRRD comprises a microphone configured to pick up audio content and/or a loudspeaker configured to reproduce audio content,
  wherein the microphone is arranged to pick up the audio content and the processor is arranged to receive the live audio content from the microphone and/or wherein the loudspeaker is connected to the processor to receive the reproduced audio content for reproduction at the loudspeaker.

Clause 11. A device for setting up the exchange of audio content, the device comprising:
  a transceiver; and
  a processor, connected to the transceiver, arranged to:
    set-up a SRRD broadcasting group of two, three or more sound recording and/or reproduction devices (SRRDs);
    configure time periods for that SRRD broadcasting group;
    set a sequential broadcasting order for the SRRD broadcasting group indicating the order of broadcasting of data by each of the SRRDs in the SRRD broadcasting group.

Clause 12. Device according to clause 11, wherein the processor is further arranged:
  to allow a SRRD to join or leave an existing SRRD broadcasting group and updating the sequential broadcasting order; and/or
  to communicate frequency hopping and/or time periods of an SRRD Broadcasting group to two or more SRRDs; and/or
  to rebroadcast a received radio packet from another SRRD in the SRRD broadcasting group; and/or
  to perform any of the features disclosed herein and/or any of the features disclosed in relation to the method.

Clause 13. A method of exchanging data, such as audio content, over a wirelessly connected group of devices, such as SRRDs, the method comprising:
  configuring a broadcasting group of three or more device;
  setting a broadcasting channel for the broadcasting group;
  configuring a sequential broadcasting order for broadcasting of the three or more wireless devices;
  repeating sequentially broadcasting of one or more radio packets by the three or more devices in the sequential broadcasting order, the radio packets comprising the data.

Clause 14. A method according to clause 13, wherein sequentially broadcasting one or more radio packets comprises broadcasting in a single payload by the first device:
  one or more radio packets comprising the data of the first device; and
  one or more radio packets that were received via broadcasting from another wireless device in the broadcasting group, wherein the received one or more radio packets comprise data from the other wireless device.

Clause 15. A device for exchanging data, such as audio content, the device comprising:
  a transceiver; and
  a processor, connected to the transceiver, arranged to:
    configure, preferably form and/or join, a broadcasting group of two, three or more devices, the broadcasting group having a configured broadcasting order;
  wherein the processor is further configured to repeatedly:
  picking up data
  broadcast, via the transceiver, one or more radio packets that comprise the picked up data;
  receive, via the transceiver, one or more radio packets comprising picked up data from one, two, or more broadcasting devices in the broadcasting group; and
  process for reproduction the received radio packets comprising data from one, two or more broadcasting devices.

Any of the disclosed embodiments can be implemented in the data exchange method.

Although in the above configuring a group and time period is discussed, it will be clear that over time the configured channel, the configured time periods and the sequence order can vary.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:
1. A method of exchanging audio content between three or more sound recording and/or reproduction devices (SRRDs), such as headsets, the method comprising:
  configuring a SRRD broadcasting group of three or more SRRDs and configuring time periods for that SRRD broadcasting group;

wherein the method comprises repeatedly:
providing, at at least two broadcasting SRRDs within the SRRD broadcasting group, respective audio data with audio content;
broadcasting, by the at least two broadcasting SRRDs, radio packets comprising the provided respective audio data;
receiving, at at least one reproducing SRRD in the SRRD broadcasting group, the broadcasted radio packets; and
audio processing the received radio packets to reproduce a combined audio content from the at least two broadcasting SRRDs at the at least one reproducing SRRD.

2. The method according to claim 1, wherein the method further comprises providing an original audio data at a first broadcasting SRRD, segmenting the original audio data in segments containing a part of the original audio content, wherein the repeated broadcasting by the first broadcasting SRRD comprises broadcasting a first segment and subsequently broadcasting a second segment, wherein the repeated receiving by the at least one reproducing SRRD comprises receiving the first segment and subsequently receiving the second segment, and wherein the repeated audio processing by the at least one reproducing SRRD comprises audio processing the first segment and subsequently audio processing the second segment to reproduce the original audio content at the reproducing SRRD.

3. The method according to claim 1, wherein the method further comprises providing one or more SRRDs, each SRRD having:
a processor,
a transceiver, and
a loudspeaker and/or a microphone,
wherein in the method the processor:
configures, by forming or joining, the SRRD broadcasting group via the transceiver;
in case the microphone is provided, is provided with the audio data picked up by the microphone of the SRRD;
broadcasts and/or receives radio packets with audio data via the transceiver; and
in case a loudspeaker is provided, processes the received audio data from the one, two or more broadcasting SRRDs in the SRRD broadcasting group and feeds the loudspeaker for reproduction of the audio content.

4. The method according to claim 1, wherein, in a configured time period, the at least two broadcasting SRRDs in the SRRD broadcasting group broadcast radio packets with the provided respective audio data, wherein
the method comprises repeating, in subsequent configured time periods, the broadcasting by the at least two broadcasting SRRDs of radio packets having the provided respective audio data; and/or
the method further comprises, at two or more reproducing SRRDs, audio processing the received audio data; and/or
the method further comprises audio processing the received radio packets from the at least two broadcasting SRRDs to reproduce a combined audio content at the reproducing SRRD of audio content provided by the at least two broadcasting SRRDs;
wherein the at least two broadcasting SRRDs broadcast sequentially and wherein one or more reproducing SRRDs sequentially receives one or more broadcasted radio packets, and/or
configuring the SRRD broadcasting group comprises configuring a sequential broadcasting order for broadcasting SRRDs in the SRRD broadcasting group, wherein the sequential broadcasting order indicates the order in which at least two broadcasting SRRDs in the SRRD broadcasting group are to broadcast radio packets comprising the provided audio data; and/or
the sequential broadcasting order is the order for broadcasting in one configured time period of consecutive configured time periods.

5. The method according to claim 1, wherein the at least two broadcasting SRRDs broadcast radio packets with the provided respective audio data sequentially or consecutively and/or interleaved, and wherein the audio processing at one reproducing SRRD is time staggered with respect to audio processing of another reproducing SRRD.

6. The method according to claim 1, wherein broadcasting by the at least two broadcasting SRRDs, comprises (re-)broadcasting audio data received in radio packets from one or more other broadcasting SRRDs.

7. The method according to claim 6, wherein the broadcasting of the one or more radio packets from the broadcasting SRRD and from the other broadcasting SRRD comprises broadcasting in a single payload.

8. The method according to claim 1, wherein the reproducing SRRD repetitively broadcasts the radio packets received from at least one of the at least two broadcasting SRRDs.

9. The method according to claim 1, wherein the method comprises repetitively broadcasting in consecutive configured time periods by the at least two broadcasting SRRDs, wherein
audio content is captured at the broadcast SRRD in segments related to the time period and broadcasted radio packet comprise audio data having a temporal length that is related to the time period, wherein at the reproducing SRRD reproduction of the received audio data results in a continuous feed of audio content; and/or
audio processing at the reproducing SRRDs comprises combining the audio content from sequentially received radio packets for reproduction; and/or
the broadcasting is sequentially in accordance with a sequential broadcast order, wherein the broadcasting is interposed in accordance with the sequential broadcast order.

10. The method according to claim 1, wherein configuring, such as forming and/or joining, the SRRD broadcasting group comprises:
configuring a channel and/or frequency for broadcasting, such as a frequency hopping sequence for broadcasting and receiving and/or configuring frequency hop parameters and security parameters; and/or;
configuring a broadcasting channel for the SRRD broadcasting group, and wherein the broadcast channel has a frame structure in the time domain, the frame having an interval time period that corresponds to the time periods; and/or
configuring fixed consecutive interval time periods; and/or
configuring a frame time period, such as a fixed frame time period, for each SRRD; and/or
configuring a fixed broadcasting time period for each SRRD; and/or
creating pairs of SRRDs, wherein a first SRRD of the pair, after receiving radio packets from the second SRRD, rebroadcasts the received radio packets of the second SRRD; and/or time synchronizing the transceiver of a second SRRD to the reception and broadcasting of radio packets by the transceiver of a first SRRD.

11. The method of claim 1, wherein configuring, such as forming and/or joining, the SRRD broadcasting group comprises configuring, such as creating or obtaining, one or more broadcast channels, such as one or more direct or unidirectional broadcast channels, in particular short-range broadcast channels, for broadcasting between two, three or more SRRDs in the SRRD broadcasting group.

12. The method of claim 1, wherein configuring, such as forming and/or joining, the SRRD broadcasting group comprises configuring a channel for broadcasting, wherein the channel has a frame structure in the time domain.

13. The method according to claim 1, wherein the method further comprises providing one or more SRRDs, each SRRD having a processor, a transceiver and a loudspeaker, and/or a microphone, wherein the SRRD is formed by two or more components, such as earpieces, wherein one component has:
the processor, and
the transceiver, and
at least one of the loudspeaker or microphone,
wherein the two or more components of the SRRD are receiving audio content, broadcasting radio packets, receiving radio packets, audio processing and reproducing the audio content received from two or more other SRRDs for a single user; and/or
wherein receiving broadcasted radio packets at the first component of the SRRD, comprises, sending at least one Audio Received (ARX) message to the second component, the method further comprising the second component of the SRRD either (1) receiving the ARX message from the first component of the SRRD, or, (2) in case no ARX is received from the first component, sending the received broadcasted radio packet to the first component of the SRRD; and/or
wherein two or more components that form the SRRD are allocated two or more time slots in the sequential broadcast order.

14. The method of claim 13, wherein one component of the SRRD rebroadcasts received radio packets and another component of that SRRD receives the rebroadcasted received radio packets.

15. A computer-readable non-transitory storage medium or a computer program product, implemented on a computer-readable non-transitory storage medium, wherein the storage medium or the computer program product comprises computer executable instructions for exchanging audio content between three or more sound recording and/or reproduction devices (SRRD), which instructions, when executed by a processor, cause the processor to carry out the steps of:
configuring, such as forming and/or joining, a SRRD broadcasting group of three or more SRRDs and configuring time periods for that SRRD broadcasting group; and
repeatedly:
providing audio content;
broadcasting one or more radio packets comprising the provided audio content;
receiving broadcasted radio packets comprising audio content from at least two broadcasting SRRDs; and
audio processing the received radio packets to reproduce a combined audio content of the at least two broadcasting SRRDs.

16. The computer-readable non-transitory storage medium or a computer program product of claim 15, wherein the repeatedly provided audio content is provided by recording audio content.

17. A device for exchanging data, such as audio content, the device comprising:
a transceiver; and
a processor, connected to the transceiver, arranged to:
configure, such as form and/or join, a broadcasting group of three or more devices, the broadcasting group having a configured broadcasting order;
wherein the processor is further configured to repeatedly:
pick up data, such as audio content;
broadcast, via the transceiver, one or more radio packets that comprise the picked up data;
receive, via the transceiver, one or more radio packets comprising picked up data from at least two broadcasting devices in the broadcasting group; and
process for reproducing a combined content from the received radio packets comprising data from the at least two broadcasting devices.

18. Device according to claim 17, wherein the device is a SRRD that comprises a microphone configured to pick up audio content and/or a loudspeaker configured to reproduce audio content,
wherein the microphone is arranged to pick up the audio content and the processor is arranged to receive the live audio content from the microphone and/or wherein the loudspeaker is connected to the processor to receive the reproduced audio content for reproduction at the loudspeaker.

19. Device according to claim 18, wherein the processor is further configured:
to pick up an original audio data, to segment the original audio data in segments containing a part of the original audio data, wherein the repeated broadcasting comprises broadcasting a first segment and subsequently broadcasting a second segment
and/or
to reproduce an original audio data from segments that contain a part of the original audio data, wherein the repeated receiving comprises receiving a first segment of the original audio data and subsequently receiving a second segment of the original audio data, and wherein the repeated audio processing comprises audio processing the first segment and subsequently audio processing the second segment to obtain the original audio data
and/or
to audio process the received radio packets comprising audio content from the at least two broadcasting SRRDs to reproduce a combined audio content.

20. Device according to claim 17, wherein the device is a SRRD and the processor is further arranged:
to configure, such as form and/or join, a SRRD broadcasting group of three or more sound recording and/or reproduction devices (SRRDs); and/or
to allow a SRRD to join or leave an existing SRRD broadcasting group and updating the sequential broadcasting order; and/or
to communicate frequency hopping and/or time periods of an SRRD Broadcasting group to two or more SRRDs; and/or
to rebroadcast a received radio packet from another SRRD in the SRRD broadcasting group; and/or to perform any of the features disclosed herein and/or any of the features disclosed in relation to the method.

* * * * *